United States Patent
Okabe et al.

(10) Patent No.: US 12,429,583 B2
(45) Date of Patent: Sep. 30, 2025

(54) OBSTACLE DETECTION DEVICE, OBSTACLE DETECTION METHOD, AND OBSTACLE DETECTION COMPUTER PROGRAM PRODUCT

(71) Applicant: PANASONIC INTELLECTUAL PROPERTY MANAGEMENT CO., LTD., Osaka (JP)

(72) Inventors: Yoshimasa Okabe, Kanagawa Ken (JP); Seisuke Yamada, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 345 days.

(21) Appl. No.: 18/118,615

(22) Filed: Mar. 7, 2023

(65) Prior Publication Data

US 2023/0288559 A1  Sep. 14, 2023

(30) Foreign Application Priority Data

Mar. 9, 2022 (JP) .................................. 2022-036411

(51) Int. Cl.
*G01S 15/931* (2020.01)
*B60T 7/22* (2006.01)
*G01S 7/539* (2006.01)

(52) U.S. Cl.
CPC .............. *G01S 15/931* (2013.01); *B60T 7/22* (2013.01); *G01S 7/539* (2013.01); *B60T 2210/32* (2013.01)

(58) Field of Classification Search
None
See application file for complete search history.

(56) References Cited

U.S. PATENT DOCUMENTS

| 4,845,682 | A | 7/1989 | Boozer et al. |
| 2002/0030357 | A1* | 3/2002 | Midorikawa ......... B60R 22/343 280/806 |

(Continued)

FOREIGN PATENT DOCUMENTS

| JP | 2003302462 A | * 10/2003 |
| JP | 2014-006234 | 1/2014 |

(Continued)

OTHER PUBLICATIONS

Office Action from Japan Patent Office (JPO) in Japanese Patent Appl. No. 2022-036411, dated Aug. 8, 2023, together with an English language translation.

*Primary Examiner* — Vladimir Magloire
*Assistant Examiner* — Ashley Brown Raynal
(74) *Attorney, Agent, or Firm* — Greenblum and Bernstein, P.L.C.

(57) ABSTRACT

An obstacle detection device is configured to evaluate a ghost likelihood of a detection point to be high when a movement pattern of the detection point does not match a movement pattern of a detection point when a received carrier wave is a reflected wave from an obstacle, when the movement pattern of the detection point matches a movement pattern when the detection point is a ghost, when a characteristic of a strength or a degree of steepness of the carrier wave matches a characteristic of a strength or a degree of steepness when the detection point is a ghost, or when another detection point that has a direction and a speed correlated with a direction and a speed of the detection point and is different from the detection point, is present.

14 Claims, 21 Drawing Sheets

(56) References Cited

U.S. PATENT DOCUMENTS

| | | | |
|---|---|---|---|
| 2016/0069998 A1 | 3/2016 | Takasuka et al. | |
| 2020/0209869 A1* | 7/2020 | Toyoura | G05D 1/0214 |
| 2023/0314604 A1* | 10/2023 | Kerstens | G01S 15/42 |
| | | | 367/89 |

FOREIGN PATENT DOCUMENTS

| | | |
|---|---|---|
| JP | 2014106115 A * | 6/2014 |
| JP | 2015-004562 | 1/2015 |
| JP | 2016-053552 | 4/2016 |
| WO | 2016/103464 | 6/2016 |
| WO | 2021/014534 | 1/2021 |

* cited by examiner

FIG.15

| TRANSMISSION ORDER OF SONAR OF OWN VEHICLE 2 | LOCUS OF DETECTION POINT GENERATED BY PLANE-SHAPED REFLECTOR | LOCUS OF DETECTION POINT GENERATED BY INTERFERENCE WAVE FROM OTHER VEHICLE 3 |
|---|---|---|
| SONAR 81a→<br>SONAR 81b→<br>SONAR 81c→<br>SONAR 81d→<br>SONAR 81a→<br>... | 811a, 811b, 811c, 811d | 821a, 821b, 821c, 821d |
| SONAR 81b→<br>SONAR 81c→<br>SONAR 81d→<br>SONAR 81a→<br>SONAR 81b→<br>... | 811a, 811b, 811c, 811d | 821a, 821b, 821c, 821d |
| SONAR 81c→<br>SONAR 81d→<br>SONAR 81a→<br>SONAR 81b→<br>SONAR 81c→<br>... | 811a, 811b, 811c, 811d | 821a, 821b, 821c, 821d |
| SONAR 81d→<br>SONAR 81a→<br>SONAR 81b→<br>SONAR 81c→<br>SONAR 81d→<br>... | 811a, 811b, 811c, 811d | 821a, 821b, 821c, 821d |

OBSTACLE DETECTION DEVICE, OBSTACLE DETECTION METHOD, AND OBSTACLE DETECTION COMPUTER PROGRAM PRODUCT

CROSS-REFERENCE TO RELATED APPLICATIONS

This application is based upon and claims the benefit of priority from Japanese Patent Application No. 2022-036411, filed on Mar. 9, 2022, the entire contents of which are incorporated herein by reference.

FIELD

The present disclosure relates to an obstacle detection device, an obstacle detection method, and a computer program product.

BACKGROUND

In the related art, there is known a technique of detecting an object such as a preceding vehicle, an obstacle, or a pedestrian by a range sensor (hereinafter, also referred to as an obstacle detection device) such as a transmitter-receiver mounted on a vehicle. There is also known a technique of performing various kinds of control for improving traveling safety of the vehicle, for example, activating an automatic brake or making a notification to a driver, based on an object detection result obtained by the range sensor.

There is disclosed a technique in which a range sensor determines whether a received carrier wave is a reflected wave from an obstacle or an interference wave (for example, a carrier wave transmitted from another vehicle) by changing a transmission interval of a carrier wave in accordance with a predetermined transmission pattern and comparing a reception pattern received by an own vehicle with the predetermined transmission pattern, and changes a transmission timing (transmission pattern) of the own vehicle to avoid hindrance by an interference wave in a case in which there is the possibility that the received carrier wave is the interference wave (for example, refer to Japanese Patent Application Laid-open No. 2016-053552).

However, when the transmission interval of the carrier wave is changed, tracking processing for detecting an object present around the vehicle is complicated, so that there is a demand for avoiding influence of interference caused by the carrier wave transmitted from another vehicle while causing the transmission interval of the carrier wave to be constant as much as possible.

The present disclosure provides an obstacle detection device that can avoid hindrance caused by interference while maintaining a transmission interval of a carrier wave to be constant as much as possible by reliably determining interference caused by a carrier wave transmitted from another vehicle.

SUMMARY

An obstacle detection device according to the present disclosure is configured to control a plurality of transmitter-receivers that are able to be mounted on a vehicle. The obstacle detection device includes a memory and a hardware processor coupled to the memory. The hardware processor is configured to: cause the plurality of transmitter-receivers to successively transmit carrier waves, based on predetermined transmission order; successively identify, in a case in which the plurality of transmitter-receivers receive carrier waves, a detection point indicating coordinates of an obstacle, based on time differences between transmission of the carrier waves and reception of the carrier wave by the plurality of transmitter-receivers, and evaluate a ghost likelihood indicating a likelihood that the identified detection point is a ghost that is generated due to reception of a carrier wave transmitted from another vehicle different from the vehicle. The hardware processor is configured to evaluate the ghost likelihood of the detection point to be high in a case falling under at least one of a case in which a movement pattern of the detection point does not match a movement pattern of a detection point in a case in which the received carrier wave is a reflected wave from the obstacle, a case in which the movement pattern of the detection point matches a movement pattern in a case in which the detection point is a ghost, a case in which a characteristic of a strength or a degree of steepness of the carrier wave matches a characteristic of a strength or a degree of steepness in a case in which the detection point is a ghost, and a case in which another detection point that has a direction and a speed correlated with a direction and a speed of the detection point and is different from the detection point, is present.

BRIEF DESCRIPTION OF THE DRAWINGS

FIG. 15 is a diagram for comparing examples of characteristics of the detection coordinates of the detection point in a case in which the sonar according to the embodiment is subjected to hindrance and the detection point identified by the sensor control device;

DETAILED DESCRIPTION

The following describes an embodiment of an obstacle detection device according to the present disclosure with reference to the drawings.

Figure 1:
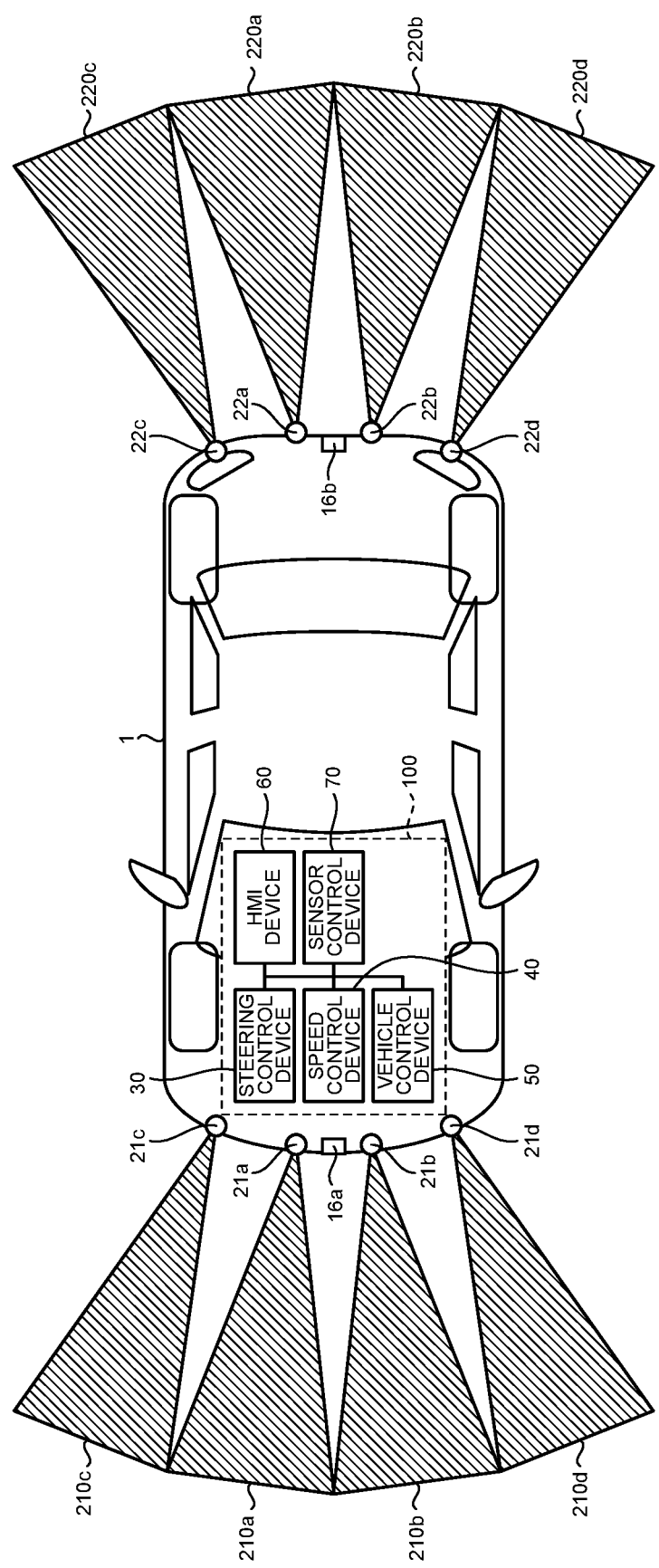
FIG. 1 is a diagram illustrating an example of a configuration of a vehicle on which an onboard system according to an embodiment is mounted.

FIG. 1 is a diagram illustrating an example of a configuration of a vehicle 1 on which an onboard system 100 according to an embodiment is mounted. As illustrated in FIG. 1, the vehicle 1 includes a steering control device 30, a speed control device 40, a vehicle control device 50, a Human Machine Interface (HMI) device 60, and a sensor control device 70. In the present embodiment, it is assumed that the onboard system 100 includes the steering control device 30, the speed control device 40, the vehicle control device 50, the HMI device 60, and the sensor control device 70. Another device may be further mounted on the vehicle 1. In FIG. 1, the steering control device 30, the speed control device 40, the vehicle control device 50, the HMI device 60, and the sensor control device 70 are illustrated as separate devices, but part of or all of these devices may be integrated with each other.

The vehicle 1 also includes sonar 21a, sonar 21b, sonar 21c, sonar 21d, sonar 22a, sonar 22b, sonar 22c, sonar 22d, an imaging device 16a, and an imaging device 16b.

The sonar 21a, the sonar 21b, the sonar 21c, the sonar 21d, the sonar 22a, the sonar 22b, the sonar 22c, and the sonar 22d are examples of a plurality of transmitter-receivers in the present embodiment. Of the sonar 21a, the sonar 21b, the sonar 21c, the sonar 21d, the sonar 22a, the sonar 22b, the sonar 22c, and the sonar 22d, the sonar 21a, the sonar 21b, the sonar 21c, and the sonar 21d are disposed at a front end part of the vehicle 1. The sonar 22a, the sonar 22b, the sonar 22c, and the sonar 22d are disposed at a rear end part of the vehicle 1.

Hereinafter, when not particularly distinguishing among the individual sonar 21a, the sonar 21b, the sonar 21c, the sonar 21d, the sonar 22a, the sonar 22b, the sonar 22c, and the sonar 22d, and the sonar 22a, the sonar 22b, the sonar 22c and the sonar 22d, they are referred to as sonar 21 and sonar 22. When collectively calling the sonar 21a, the sonar 21b, the sonar 21c, and the sonar 21d, they are referred to as front sonar 21. When collectively calling the sonar 22a, the sonar 22b, the sonar 22c, and the sonar 22d, they are referred to as rear sonar 22.

The sonar 21 and the sonar 22 to which the sensor control device 70 for controlling them is added are called a sonar system or a range finding device. The sonar 21 and the sonar 22 may be referred to as sonar modules in some cases so as to be distinguished from the sonar system. The sonar system is a kind of range finding device that transmits and receives a carrier wave and converts a time difference between transmission and reception into a distance, and used as an obstacle detection device in the vehicle 1. The sonar module serves as both of a transmitter and a receiver, so that the sonar module may be referred to as a transmitter-receiver. In a case of the sonar, the carrier wave is a sound wave (ultrasonic wave), so that the carrier wave may be read as the sound wave in the following description.

Herein, the carrier wave (sound wave) is called with different terms in accordance with its state. The carrier wave transmitted from a transmitter is referred to as a probing wave, a carrier wave generated when the probing wave is reflected by an object is referred to as a reflected wave, a carrier wave received by a receiver is referred to as a received wave, and a received wave obtained by receiving a probing wave transmitted from another object other than the vehicle 1 is referred to as an interference wave. Herein, the object other than the vehicle 1 is assumed to be sonar of another nearby vehicle. The probing wave (interference wave) transmitted from sonar of another vehicle directly reaches a receiver without being reflected by an object, so that it may be referred to as a direct wave.

On the vehicle 1, the sonar 21 and the sonar 22 are disposed at positions advantageous for detection or range finding for a peripheral object. For example, a plurality of pieces of the sonar 21 and the sonar 22 are disposed at intervals on bumpers at the front end part and the rear end part of the vehicle 1, and detect objects in front of or in rear of the vehicle 1.

The sonar 21 and the sonar 22 are provided in the vehicle 1 to transmit ultrasonic waves, and detects an object around the vehicle 1 and obtains distance information to the detected object by measuring a time until a reflected wave reflected from the object around the vehicle 1 is received. In the present embodiment, it is assumed that an "object" or an "obstacle" encompasses a pedestrian and another vehicle. Additionally, the obstacle does not encompass an object that does not obstruct traveling of the vehicle 1, for example, projections and depressions on a road surface.

More specifically, first front center sonar 21a is disposed to the right of the center of the front end part of the vehicle 1, and second front center sonar 21b is disposed to the left of the center of the front end part of the vehicle 1. At the front end part of the vehicle 1, first front corner sonar 21c is disposed to be closer to a corner part on the right side than the first front center sonar 21a. At the front end part of the vehicle 1, second front corner sonar 21d is disposed to be closer to a corner part on the left side than the second front center sonar 21b.

First rear center sonar 22a is disposed to the right of the center of the rear end part of the vehicle 1, and second rear center sonar 22b is disposed to the left of the center of the rear end part of the vehicle 1. At the rear end part of the vehicle 1, first rear corner sonar 22c is disposed to be closer to a corner part on the right side than the first rear center sonar 22a. At the rear end part of the vehicle 1, second rear corner sonar 22d is disposed to be closer to a corner part on the left side than the second rear center sonar 22b.

In FIG. 1, a range in which the first front center sonar 21a can detect an object is assumed to be a detection range 210a, a range in which the second front center sonar 21b can detect an object is assumed to be a detection range 210b, a range in which the first front corner sonar 21c can detect an object is assumed to be a detection range 210c, and a range in which the second front corner sonar 21d can detect an object is assumed to be a detection range 210d. When not particularly distinguishing among the individual detection ranges 210a to 210d, they are simply referred to as detection ranges 210.

Additionally, a range in which the first rear center sonar 22a can detect an object is referred to as a detection range 220c, a range in which the second rear center sonar 22b can detect an object is referred to as a detection range 220b, a range in which the first rear corner sonar 22c can detect an object is referred to as a detection range 220c, and a range in which the second rear corner sonar 22d can detect an object is referred to as a detection range 220d. When not particularly distinguishing among the individual detection ranges 220a to 210d, they are simply referred to as detection ranges 220.

In FIG. 1, the detection ranges 210 and the detection ranges 220 are separately illustrated, but actually, the detection ranges 210 and the detection ranges 220 of adjacent pieces of the sonar 21 and the sonar 22 overlap with each other.

For example, in a case in which the vehicle 1 moves forward, the front end part of the vehicle 1 is present on a traveling direction side of the vehicle 1, so that the first front center sonar 21a is an example of first center range finding means, and the second front center sonar 21b is an example of second center range finding means. The first front center sonar 21a and the second front center sonar 21b are disposed to be directed to the traveling direction of the vehicle 1. In this case, the first front corner sonar 21c is an example of first corner range finding means, and the second front corner sonar 21d is an example of second corner range finding means.

Furthermore, in a case in which the front end part of the vehicle 1 is present on the traveling direction side of the vehicle 1, the first front center sonar 21a and the first front corner sonar 21c are examples of right side range finding means disposed to be directed to a direction to the right from the traveling direction of the vehicle 1. In this case, the second front center sonar 21c and the second front corner sonar 21d are examples of left side range finding means disposed to be directed to a direction to the left from the traveling direction of the vehicle 1.

When not particularly distinguishing among the first front center sonar 21a, the second front center sonar 21b, the first rear center sonar 22a, and the second rear center sonar 22b, they are simply referred to as center sonar 21a, 21b, 22a, and 22b. When not particularly distinguishing among the first front corner sonar 21c, the second front corner sonar 21d, the first rear corner sonar 22c, and the second rear corner sonar 22d, they are simply referred to as corner sonar 21c, 21d, 22c, and 22d.

In the present embodiment, the following mainly describes a specific example of a case in which the traveling direction of the vehicle 1 is a front side, but in a case in which the traveling direction of the vehicle 1 is a rear side, for example, a function exemplified by using the front sonar 21 may be applied to the rear sonar 22.

In a case in which the vehicle 1 moves straight forward, an obstacle positioned in the traveling direction of the vehicle 1 is detected by the first front center sonar 21a and the second front center sonar 21b closer to an inner side. In a case in which the vehicle 1 moves forward to turn to the left or turn to the right, an object positioned at a destination of a left turn or a destination of a right turn is detected by the first front corner sonar 21c or the second front center sonar 21b.

Furthermore, when an obstacle comes from a right lateral side of the vehicle 1 toward a right front side of the vehicle 1, the first front corner sonar 21c or the first front center sonar 21a detects the obstacle first. Additionally, when an obstacle comes from a left lateral side of the vehicle 1 toward a left front side of the vehicle 1, the second front corner sonar 21d or the second front center sonar 21b detects the obstacle first.

Figure 3:
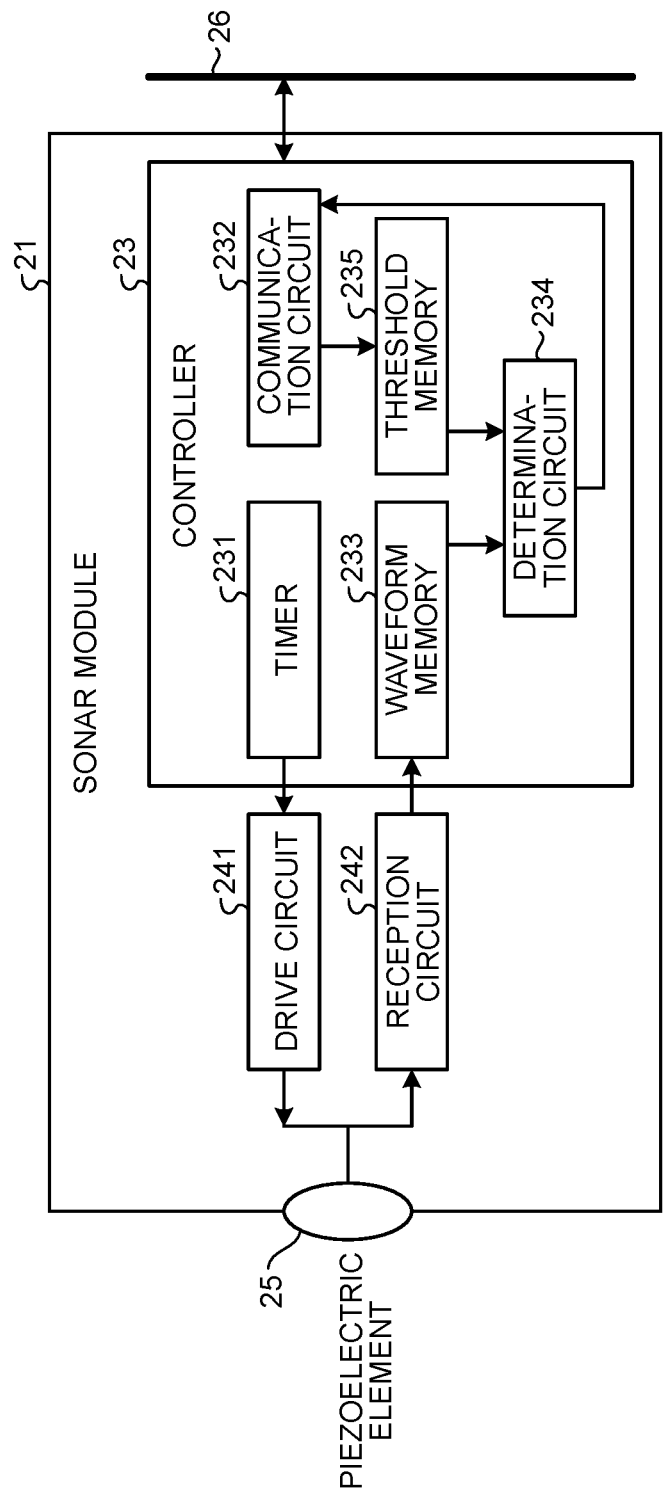
FIG. 3 is a diagram illustrating an example of a configuration of sonar according to the embodiment.

Disposition places and the number of pieces of the sonar 21 and the sonar 22 are not limited to the example illustrated in FIG. 1. The following describes details about the sonar 21 and the sonar 22 with reference to FIG. 3. FIG. 3 is a diagram illustrating an example of a configuration of the sonar 21 and the sonar 22 according to the embodiment. Each piece of the sonar 21 and the sonar 22 is also referred to as a sonar module. The sonar module includes a controller 23, a drive circuit 241, a reception circuit 242, and a piezoelectric element 25.

The controller 23 includes a timer 231, a communication circuit 232, a waveform memory 233, a determination circuit 234, and a threshold memory 235. Additionally, the controller 23 is connected to the sensor control device 70 via a transmission path 26. The controller 23 may also be connected to the vehicle control device 50 via the transmission path 26.

The sonar 21 and the sonar 22 transmit ultrasonic waves (carrier waves) when an AC voltage is applied to the piezoelectric element 25. For example, when the controller 23 controls the drive circuit 241 to apply an AC voltage of 50 KHz to the piezoelectric element 25, the piezoelectric element 25 transmits an ultrasonic wave at the same frequency. An envelope of the ultrasonic wave to be transmitted is pulse-like. It can be also said that the piezoelectric element 25 AM-modulates the carrier wave (ultrasonic wave) in a pulse waveform to be transmitted. The pulse-like ultrasonic wave is reflected when hitting a road surface or an obstacle, and partially returned to the sonar 21 and the sonar 22 as a reflected wave.

The piezoelectric element 25 then converts a sound pressure of the returned reflected wave into a voltage. The piezoelectric element 25 is an example of conversion means in the present embodiment. The reception circuit 242 amplifies and rectifies the voltage that is converted from the sound pressure by the piezoelectric element 25, and converts it into a sound wave reception strength. A waveform indicating a temporal change of the converted sound wave reception strength is referred to as a reception waveform.

A reception signal and an amplified reception signal are alternating currents, and the sound wave reception strength is obtained by rectifying the amplified reception signal, so that they are both obtained by processing the reception signal although there is a difference between the alternating current and a direct current. Thus, they may be collectively referred to as reception signals without distinguish between the alternating current and the direct current. The reception circuit 242 includes an amplifier circuit (amplifier) (not illustrated) that amplifies the voltage that is converted from the sound pressure by the piezoelectric element 25. The reception circuit 242 or the amplifier circuit included in the reception circuit 242 is an example of amplification means in the present embodiment.

Return to FIG. 2. Each of the imaging device 16*a* and the imaging device 16*b* is a camera for imaging surroundings of the vehicle 1. In FIG. 1, the imaging device 16*a* is disposed at the front end part of the vehicle 1, and can image the surroundings including a front side of the vehicle 1. The imaging device 16*b* is disposed at the rear end part of the vehicle 1, and can image the surroundings including a rear side of the vehicle 1. Disposition places and the number of the imaging device 16*a* and the imaging device 16*b* are not limited to the example illustrated in FIG. 1.

The imaging device 16*b* on the rear side is not essential, and only the imaging device 16*a* may be mounted on the vehicle 1. Hereinafter, when not particularly distinguishing between the imaging device 16*a* and the imaging device 16*b*, they are simply referred to as imaging devices 16. The imaging device 16 is an example of imaging means in the present embodiment.

The sonar 21, the sonar 22, and the imaging device 16 may be collectively referred to as a detection device. The vehicle 1 does not necessarily include the imaging device 16. The vehicle 1 may also include an antenna that can receive Global Positioning System (GPS) signals, and a GPS device (not illustrated) that identifies GPS coordinates indicating the position of the vehicle 1 based on the received GPS signals.

The steering control device 30 controls a steering angle of the vehicle 1. The steering control device 30 is also referred to as a steering angle control device. For example, the steering control device 30 is disposed at a position advantageous for assisting steering of a power steering system of the vehicle 1.

The speed control device 40 controls acceleration and braking of the vehicle 1. For example, the speed control device 40 is disposed at a position advantageous for controlling an engine or a motor, and a brake.

The vehicle control device 50 is a device that controls various kinds of behavior of the vehicle 1, and is disposed in the vicinity of the steering control device 30 and the speed control device 40, for example.

The HMI device 60 includes a display that can display information, and a touch panel, a switch, or the like that can receive an operation by a user. The display and the touch panel may be configured as an integrated device. The display is also referred to as a display unit. Each of the touch panel and the switch is also referred to as an operation unit. The display unit and the operation unit included in the HMI device 60 are disposed around a driver's seat.

The sensor control device 70 controls the sonar 21 and the sonar 22. To minimize interference between the sonar 21 and the sonar 22, the sensor control device 70 controls transmission order so that a positional relation between pieces of the sonar that perform transmission at the same time becomes a diagonal relation in a front and rear direction of a vehicle body. Thus, also when facing or succeeding a vehicle equipped with the same sonar system, a positional relation between pieces of sonar that perform transmission at the same time may become a diagonal relation with respect to the other vehicle. The sensor control device 70 may further control the imaging device 16. Alternatively, the vehicle control device 50 described above may control the imaging device 16.

Each of the sensor control device 70, the sonar 21, and the sonar 22 is an example of an obstacle detection device in the present embodiment. The sensor control device 70 as a single item may be assumed to be an example of the obstacle detection device. It may be assumed that the obstacle detection device includes the entire onboard system 100, or any of the steering control device 30, the speed control device 40, the vehicle control device 50, and the HMI device 60 included in the onboard system 100.

The steering control device 30, the speed control device 40, the vehicle control device 50, the HMI device 60, and the sensor control device 70 are connected to each other in a wired manner via a local area network such as a controller area network (CAN), for example. The sonar 21, the sonar 22, and the imaging device 16 may be connected to the local area network, or may be connected to the sensor control device 70 or the vehicle control device 50 via dedicated wiring.

Figure 2:
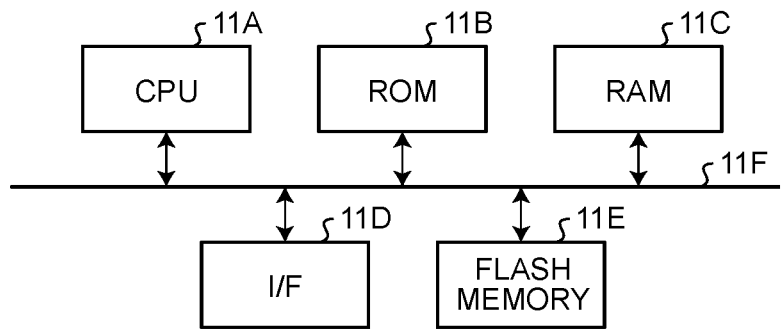
FIG. 2 is a diagram illustrating an example of a hardware configuration of a sensor control device according to the embodiment.

Next, the following describes a hardware configuration of the sensor control device 70. FIG. 2 is a diagram illustrating an example of the hardware configuration of the sensor control device 70 according to the embodiment. As illustrated in FIG. 2, the sensor control device 70 has the hardware configuration using a normal computer in which a central processing unit (CPU) 11A, a read only memory (ROM) 11B, a random access memory (RAM) 11C, an interface (I/F) 11D, a flash memory 11E, and the like are connected with each other via a bus 11F.

The CPU 11A is an arithmetic device that controls the entire sensor control device 70. The CPU 11A is an example of a processor, and another processor or a processing circuit may be disposed in place of the CPU 11A. A ROM 11B stores a computer program and the like that implement various kinds of processing performed by the CPU 11A. The RAM 11C is, for example, a main storage device of the sensor control device 70, and stores data required for various kinds of processing performed by the CPU 11A.

The I/F 11D is an interface for transmitting and receiving data. The I/F 11D may also transmit/receive information to/from the other device mounted on the vehicle 1 via a CAN and the like in the vehicle 1. The flash memory 11E is an example of a writable non-volatile storage medium. Each of the ROM 11B, the RAM 11C, and the flash memory 11E is also referred to as a storage unit. The sensor control device 70 may also include another storage device such as a hard disk drive (HDD) in place of the flash memory 11E, or in addition to the flash memory 11E.

It is assumed that a hardware configuration of each of the steering control device 30, the speed control device 40, the vehicle control device 50, and the HMI device 60 also includes a processing circuit such as a CPU, a ROM, a RAM, an I/F, and a flash memory, for example.

Figure 4:
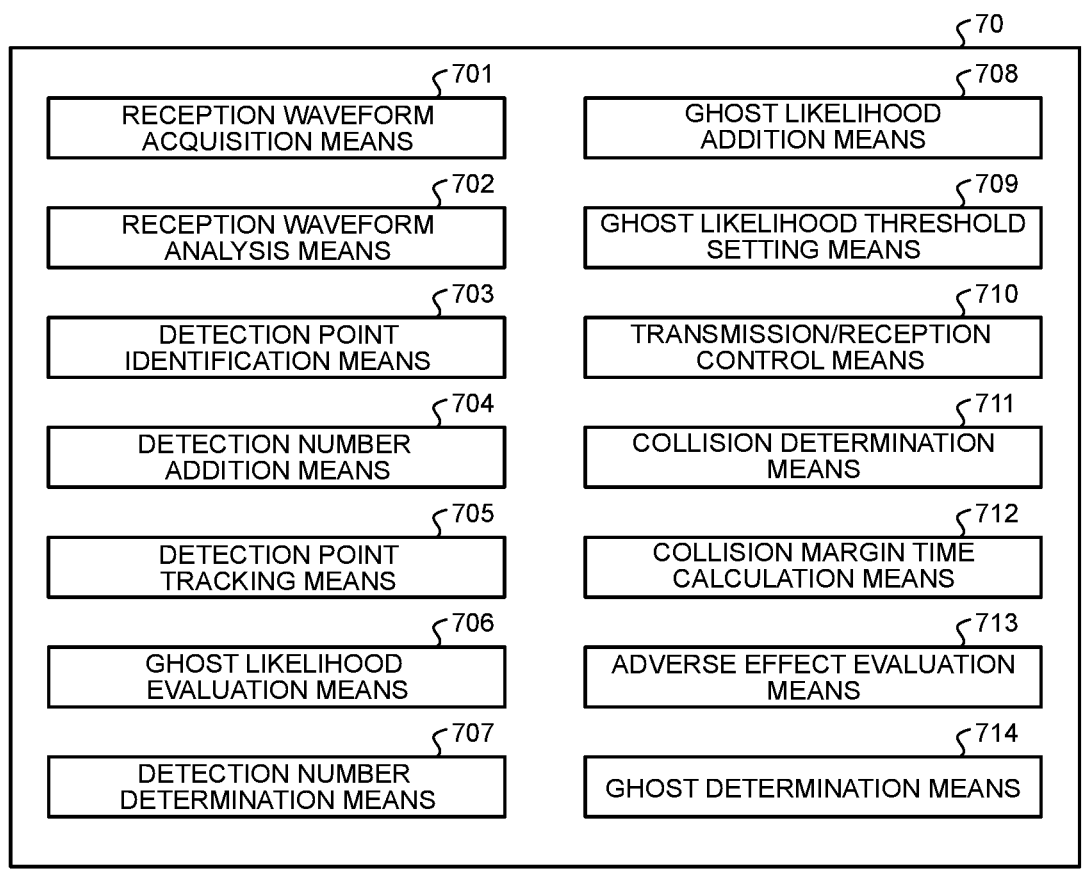
FIG. 4 is a block diagram illustrating an example of functions provided in the sensor control device according to the embodiment.

FIG. 4 is a block diagram illustrating an example of functions provided in the sensor control device 70 according to the embodiment. As illustrated in FIG. 4, the sensor control device 70 according to the present embodiment includes a reception waveform acquisition means 701, a reception waveform analysis means 702, a detection point identification means 703, a detection number addition means 704, detection point tracking means 705, a ghost likelihood evaluation means 706, a detection number determination means 707, a ghost likelihood addition means 708, a ghost likelihood threshold setting means 709, transmission/reception control means 710, a collision determination means 711, a collision margin time calculation means 712, an adverse effect evaluation means 713, and a ghost determination means 714. The functions provided in the sensor control device 70 are not limited thereto.

The reception waveform acquisition means 701 acquires reception waveforms from a plurality of transmitter-receivers. For example, the reception waveform acquisition means 701 acquires reception waveforms indicating temporal changes of strengths of sound waves received by a plurality of pieces of the sonar 21 and the sonar 22 mounted on the vehicle 1.

Specifically, the sonar 21 and the sonar 22 mounted on the vehicle 1 transmit probing waves. The transmitted probing waves hit an obstacle present around the vehicle 1. When the probing waves hit the obstacle, the probing waves are reflected by the obstacle, and sound waves are returned. The sonar 21 and the sonar 22 receives the sound waves (reflected waves) that are reflected by the obstacle and returned. The sonar 21 and the sonar 22 generates reception waveforms indicating temporal changes of the strengths of the received sound waves, and the reception waveform acquisition means 701 acquires the reception waveforms from the sonar 21 and the sonar 22.

The reception waveform is obtained by converting the received wave into an AC voltage to be further amplified and subjected to envelope detection (rectification), which is a waveform representing a temporal change of an amplitude of the received wave. The probing wave is obtained by AM-modulating the carrier wave with a pulse waveform, and envelope detection corresponds to AM-demodulation. In the reception waveform, the pulse waveform is deformed to be a peak waveform, so that a rise time of the peak waveform is identified to be treated as a reception time of the pulse waveform. It can also be said that the sonar system measures a time difference between a transmission time at which a pulse is put on the carrier wave (sound wave) and a reception time of the pulse.

The reception waveform analysis means 702 calculates a reception strength or a degree of steepness of the peak waveform corresponding to the detection point in the reception waveform. Specifically, the reception waveform analysis means 702 extracts the peak waveform from the reception waveform acquired by the reception waveform acquisition means 701, and calculates the reception strength (maximum value) thereof or the degree of steepness (a variation rate of the reception strength, or a half-value width of the peak waveform). The reception waveform analysis means 702 also evaluates the reception strength or the degree of steepness of the peak waveform corresponding to the detection point identified by the detection point identification means 703 described later. Evaluation of the reception strength or the degree of steepness of the peak waveform will be described later.

Based on a time from when one transmitter-receiver transmits the probing wave until the transmitter-receivers receive reflected waves reflected by the obstacle present around the vehicle 1 to be returned, the detection point identification means 703 successively identifies detection points indicating coordinates of the detected obstacle.

Figure 5:
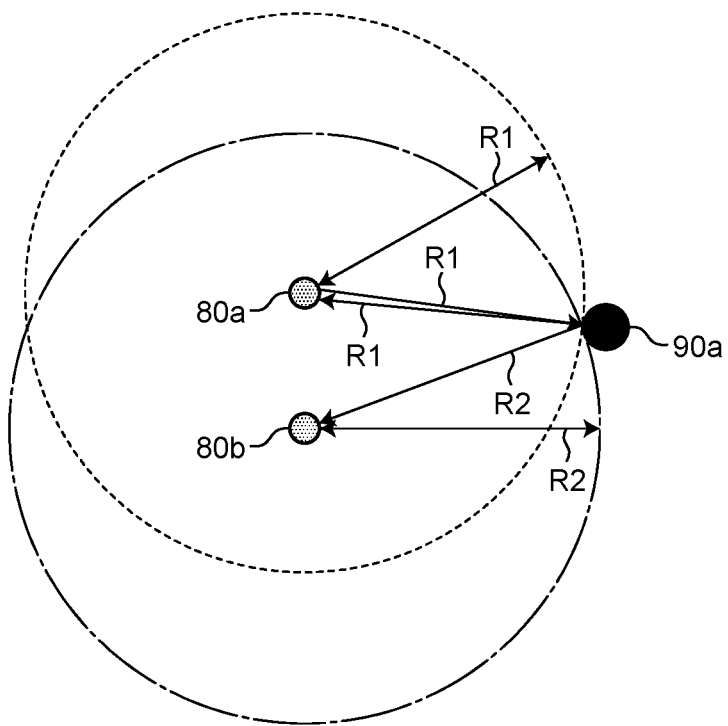
FIG. 5 is a diagram illustrating an example of detection coordinates identified by the sensor control device according to the embodiment.

Herein, the following describes a method for identifying the coordinates of the obstacle detected by the sonar 21 and the sonar 22 with reference to FIG. 5. FIG. 5 is a diagram illustrating an example of the detection coordinates identified by the sonar according to the embodiment.

When detecting the reflected wave from an object $90a$ after T1 (s) has elapsed after sonar $80a$ transmits the sound wave, assuming that a one-way distance from the sonar $80a$ to the object $90a$ is R1 (m), a path length of the sound wave is 2R1 (m), so that it is assumed that T1 has elapsed while the sound wave travels at a sonic speed M (m/s) by a distance 2R1. Accordingly, the one-way distance R1 (m) from the sonar $80a$ to the object $90a$ can be calculated by $R1=T1 \times M \div 2$.

In a case in which sonar $80b$ detects the reflected wave from the object $90a$ after T2 (s) has elapsed after transmission performed by the sonar $80a$, the path length of the sound wave is represented as R1+R2 (m), so that a one-way distance R2 (m) from the sonar $80b$ to the object $90a$ can be calculated by $R2=T2 \times M \div R1$.

Positions of the sonar $80a$ and the sonar $80b$ are known, so that a position of the detection point of the object $90a$ can be identified as a position of an intersection point of a circle having a radius R1 centered on the sonar $80a$ and a circle having a radius R2 centered on the sonar $80b$. The position of the object $90a$ is identified by using, as a starting point, a position of the sonar of the own vehicle that has transmitted the sound wave.

Return to FIG. 4. The detection number addition means 704 counts the number of times the detection point identified by the detection point identification means 703 is repeatedly detected. Specifically, regarding the detection point that is identified by the detection point identification means 703 after the number of detections is initialized, if the detection point is not the same detection point as the detection point that has been previously detected, the detection number addition means 704 assumes the number of detections to be one. Thereafter, when the detection point identified by the detection point identification means 792 is the same detection point as the detection point that has been previously detected, the number of detections is added as occasion demands.

In a case in which the same detection point as the detection point that has been previously detected is not detected a predetermined number of times, the detection number addition means 704 initializes the number of detections. The detection point tracking means 705 (described later) determines whether the detection point is the same detection point as the detection point that has been previously detected. The detection point tracking means 705 estimates a movement amount and a moving direction of the detection point, and may determine that the detection point is the same detection point as the detection point that has been previously detected not only in a case in which the position of the detection point is the same as a previous position but also in a case in which the position of the detection point is different from the previous position.

The detection point tracking means 705 estimates the movement amount and the moving direction of the detection point based on the detection point identified by the detection point identification means 703, and determines whether the detection point is the same as the detection point that has been previously detected. The determination of whether the detection point is the same as the detection point that has been previously detected is referred to as identity determination.

Figure 6:
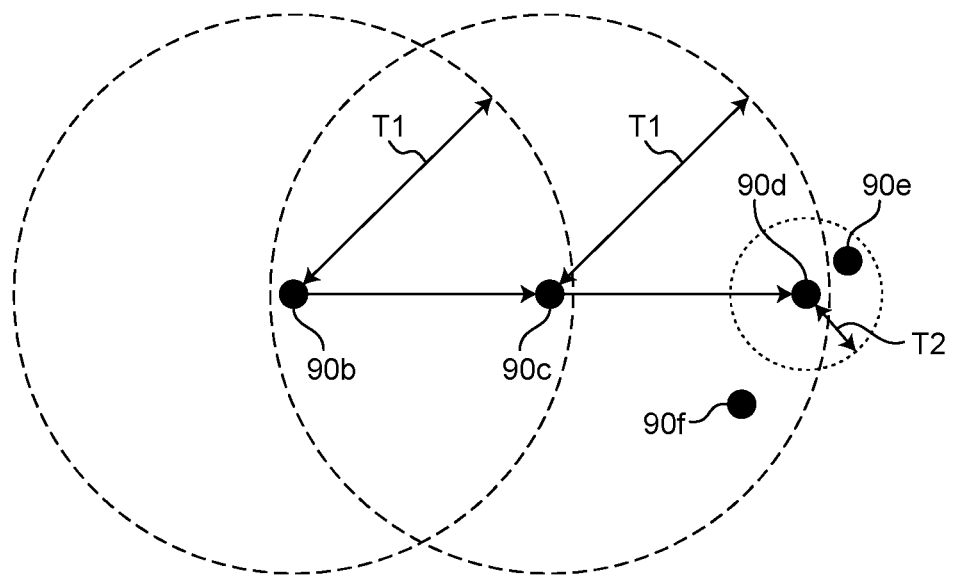
FIG. 6 is a diagram illustrating an example of a detection point tracked by the sensor control device according to the embodiment.

The following describes a method in which the detection point tracking means 705 tracks the detection point to identify the obstacle with reference to FIG. 6. FIG. 6 is a diagram illustrating an example of the detection point tracked by the sensor control device according to the embodiment.

The sonar 21 and the sonar 22 may receive transmission sound of sonar of another vehicle or sound emitted from construction equipment in some cases, for example. However, a time difference between a reception time of sound that is emitted independently of a transmission period of the sonar, such as sound emitted from construction equipment, and a transmission time of the sonar is random, so that the position of the detection point varies each time if the position of the detection point is calculated based on the time difference.

Thus, the detection point that is continuously detected at the same position multiple times is identified as an obstacle, and the detection point that appears at a position unrelated to a previous position is rejected as hindrance (noise). That is, the detection point before being identified as the obstacle is an obstacle candidate, and includes hindrance. However, the detection point tracking means 705 selects the detection point that appears at a substantially fixed position every time to remove hindrance from the obstacle candidate.

However, in a case in which the received wave is a probing wave (interference wave) of sonar of another vehicle, a time difference from the transmission time of the sonar of the own vehicle is fixed, and the detection point generated by the interference wave may appear at a fixed position every time, so that the detection point cannot be easily rejected as hindrance in some cases. It is assumed that the probing wave of the sonar of the other vehicle is particularly referred to as the interference wave, and the detection point generated by the interference wave is referred to as a ghost. That is, it can be said that a problem to be solved by the present application is to discriminate the ghost generated by the interference wave from the detection point generated by the reflected wave, and reject the ghost.

Here, considered is a case in which whether a detection point 90b identified by previous detection and a detection point 90c identified by current detection are the same detection point is determined in tracking processing. For example, assuming that a relative speed of the obstacle is 20 (km/h) (converted into a speed per second, 5.5 (m/s)) when a detection period is 100 (ms), the obstacle moves by 55 (cm) during two times of detection.

Assuming that an identity determination threshold for determining the detection points are the same is T1 (=60 (cm)), a distance difference between the detection point 90b and the detection point 90c is smaller than the identity determination threshold, so that it is determined that the same object moves by 55 (cm). That is, if the detection point is present within a circle having a radius (identity determination threshold) T1 from the previous detection point, it is determined that the detection point is the same object. The detection point tracking means 705 identifies a moving speed and a moving direction of the object based on a change amount of the position of the detection point determined to be the same object, and estimates a position at which the detection point will appear next. This process is referred to as estimation of movement.

For example, the detection point tracking means 705 calculates a circle (hereinafter, also referred to as a predicted circle based on estimation of movement) having a radius T2 that is centered on a detection point 90d as a point at which the detection point is estimated to appear next and indicates a range of performing identity determination on detection coordinates at the next time based on the previous detection points (the detection point 90b and the detection point 90c), and if a detection point 90e is present within the predicted circle, the object is determined to be the same object even if the detection point 90e is out of the circle having the radius of the identity determination threshold T1.

On the other hand, even if a detection point 90f is present within the circle of the identity determination threshold T1, the detection point 90f is out of the predicted circle having the radius T2 and the detection point 90e is present within the predicted circle, so that the detection point tracking means 705 determines that the detection point 90f is an object different from the detection point 90b, the detection point 90c, and the detection point 90d. That is, even if a distance from the previous detection point is equal to or smaller than the identity determination threshold before performing estimation of movement, when the detection point is out of the predicted circle based on estimation of movement, the detection point may be rejected by identity determination.

Return to FIG. 4. The ghost likelihood evaluation means 706 evaluates a ghost likelihood indicating the likelihood that the detection point identified by the detection point identification means 703 is the detection point (ghost) generated by the interference wave transmitted from the other vehicle different from the vehicle 1. The ghost likelihood evaluation means 706 evaluates the ghost likelihood of the detection point to be high in at least one of a case in which the movement amount and the moving direction of the detection point do not match the movement amount and the moving direction corresponding to a change of the position of the transmitter-receiver, a case in which a peak waveform corresponding to the detection point does not match a peak waveform determined in advance, and a case in which another detection point different from the detection point is present, the moving speed of the other detection point being substantially two times the moving speed of the detection point.

For example, in a case in which the movement amount and the moving direction identified by the detection point tracking means 705 do not match the movement amount and the moving direction corresponding to the change of the position of the transmitter-receiver, the ghost likelihood evaluation means 706 evaluates the ghost likelihood of the detection point to be high.

In a case in which a maximum value of the reception strength included in the peak waveform of the detection point identified by the detection point identification means 703 is larger than a maximum value of the reception strength determined in advance when the probing wave is reflected at a distance identified as the position of the peak waveform, or a case in which the degree of steepness of the peak waveform of the detection point identified by the detection point identification means 703 is larger than a threshold of the degree of steepness determined in advance, the ghost likelihood evaluation means 706 evaluates the ghost likelihood of the detection point to be high.

In a case in which another different detection point that is in substantially the same direction as the detection point identified by the detection point identification means 703, and the moving speed thereof is substantially two times the moving speed of the detection point, is present, the ghost likelihood evaluation means 706 evaluates the ghost likelihood of the detection point to be high.

Figure 7:
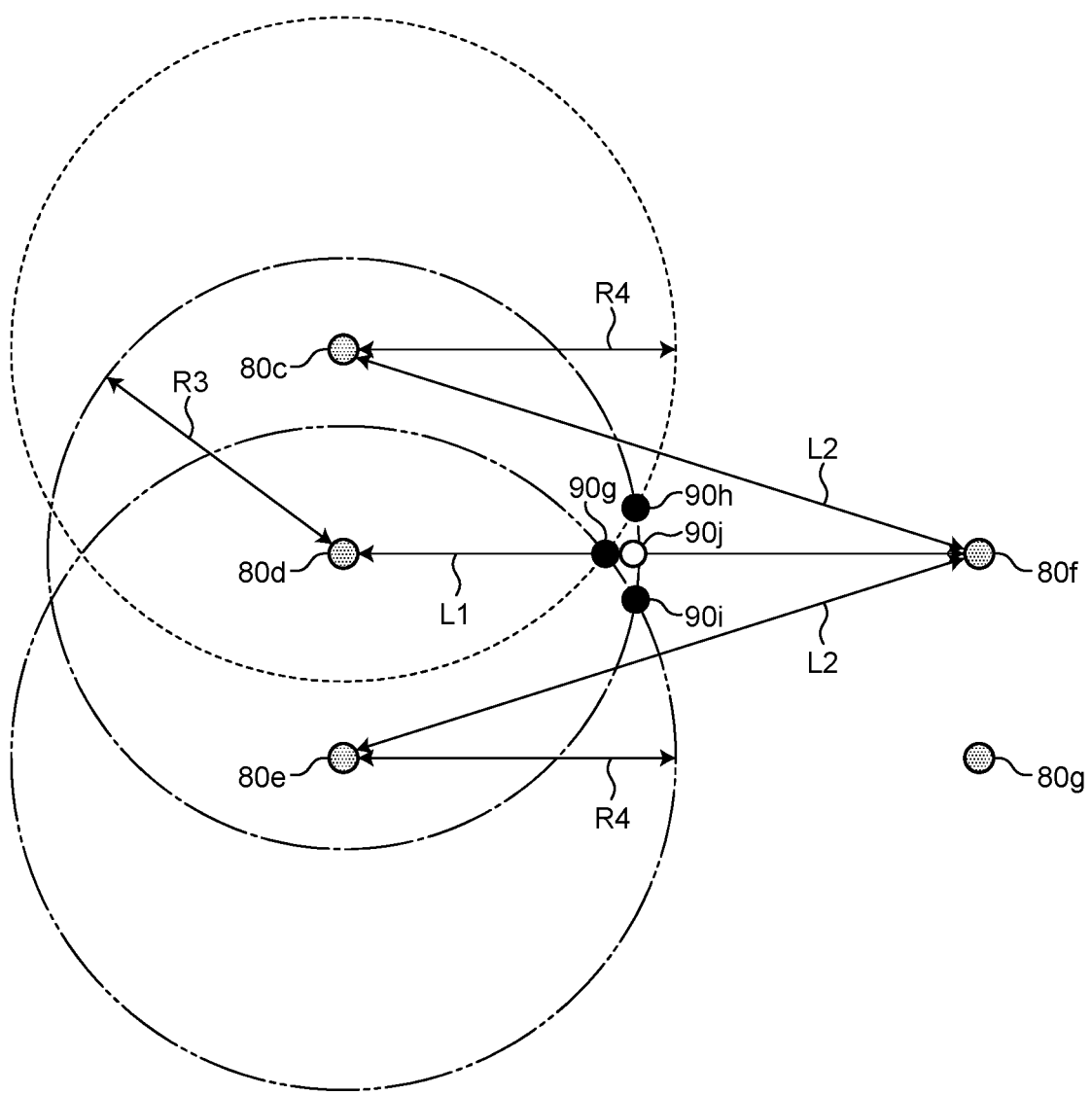
FIG. 7 is a diagram illustrating an example of a characteristic in a case in which the sonar according to the embodiment is subjected to hindrance.
Figure 8:
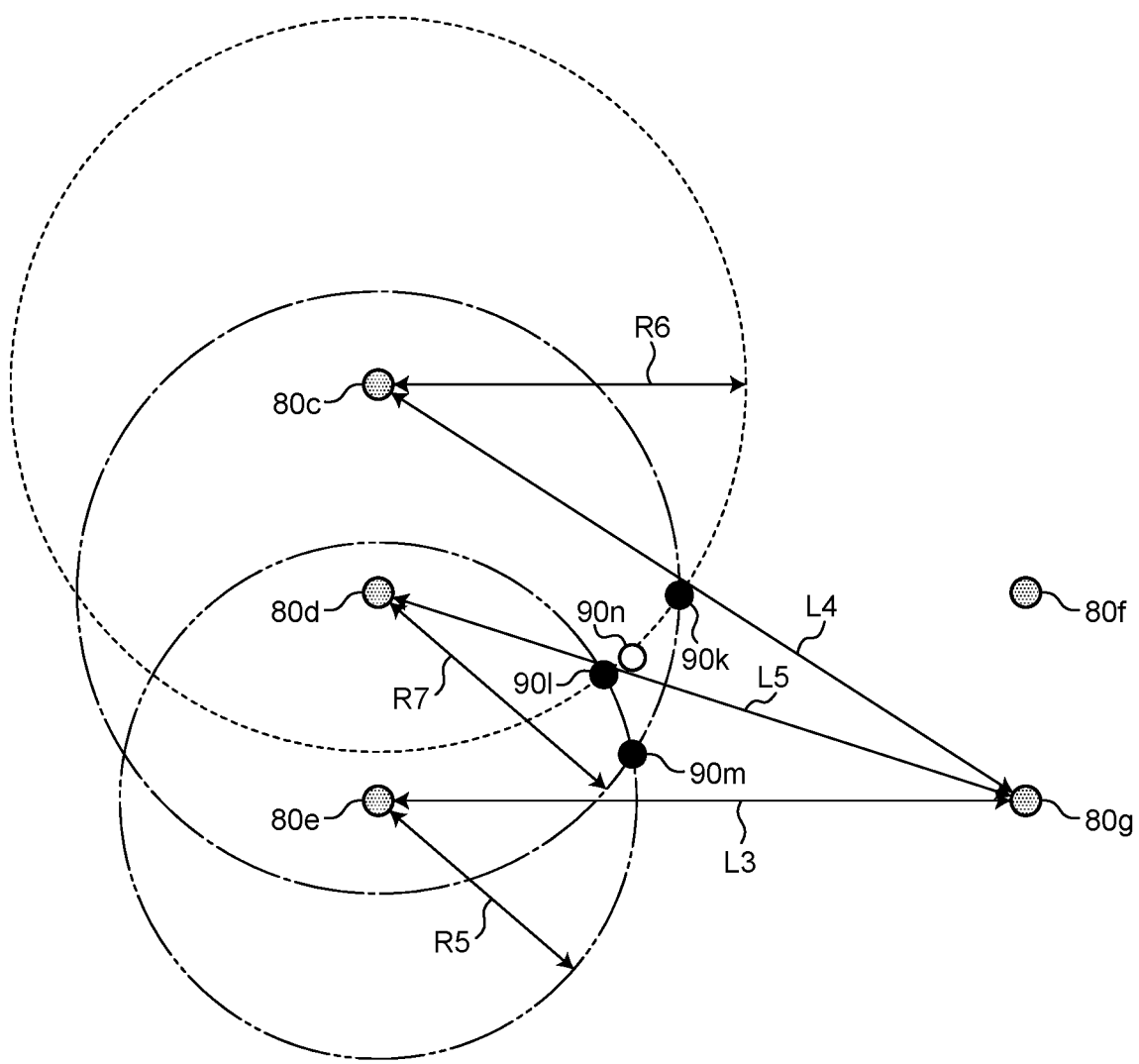
FIG. 8 is a diagram illustrating an example of a characteristic in a case in which the sonar according to the embodiment is subjected to hindrance.

The following describes characteristics of the detection point in a case in which the sonar of the own vehicle is subjected to hindrance by the sonar of the other vehicle with reference to FIG. 7 and FIG. 8. FIG. 7 and FIG. 8 are diagrams illustrating examples of the characteristics in a case in which the sonar according to the embodiment is subjected to hindrance.

First, in FIG. 7 and FIG. 8, it is assumed that sonar 80c, sonar 80d, and sonar 80e are sonar of the own vehicle, and sonar 80f and sonar 80g are sonar of the other vehicle. FIG. 7 explains the detection points in a case in which the sonar 80f and the sonar 80g perform transmission at the same time. FIG. 8 explains the detection points in a case in which the sonar 80c and the sonar 80g perform transmission at the same time.

The sonar 80c, the sonar 80d, and the sonar 80e estimate a distance based on a reception time of the sound wave, and when circles having a radius of the distance estimated by detection centered on the respective sonar 80c, the sonar 80d, and the sonar 80e are depicted, intersection points of the circles are the detection points.

In FIG. 7, it is assumed that a distance from the sonar 80d to the sonar 80f is L1 (m), and a distance from the sonar 80f to each of the sonar 80c and the sonar 80e is L2 (m). In a case in which the sonar 80f and the sonar 80d perform transmission at the same time, an estimated distance from the sonar 80d is L1/2(=R3) (m). The reception time of the sonar 80c and the sonar 80e is later than that of the sonar 80d because L2>L1. Thus, an estimated distance R4 is larger than an estimated distance R3. As a result, the detection points can be represented as intersection points at which three circles intersect with each other, the three circles including a circle having a radius L1/2(=R3) (m) from the sonar 80d, and circles having a radius of the estimated distance R4(R4>R3) (m) from the respective sonar 80c and the sonar 80e.

A difference between the estimated distance R3 and the estimated distance R4 is caused by a difference in the distance from the sonar 80f, and does not correspond to a distance difference from the same reflector, so that positions of a detection point 90g identified by combining circles centered on the sonar 80c and the sonar 80e, a detection point 90h identified by combining circles centered on the sonar 80c and the sonar 80d, and a detection point 90i identified by combining circles centered on the sonar 80d and the sonar 80e are different from each other.

However, the positions of the three detection points are close to each other, so that they are processed assuming that different portions of the same reflector are detected. Thus, a position at which a centroid of a plurality of detection points including the detection point 90g, the detection point 90h, and the detection point 90i is obtained is referred to as a representative detection point 90j, which represents the position of the reflector. The representative detection point may be simply referred to as the detection point.

Next, in FIG. 8, it is assumed that a distance from the sonar 80e to the sonar 80g is L3 (m), a distance from the sonar 80c to the sonar g is L4 (m), and a distance from the sonar 80d to the sonar g is L5 (m). In a case in which the sonar 80g and the sonar 80c perform transmission at the same time, the estimated distance from the sonar 80c is L4/2 (=R6) (m). Reception times of the sonar 80d and the sonar 80e are earlier than that of the sonar 80c, so that estimated distances are shorter than the estimated distance from 80c (R6>R7>R5). As a result, detection points to be calculated can be represented as intersection points at which three circles intersect with each other, the three circles including a circle having a radius L4/2 (=R6) (m) from the sonar 80c, a circle having a radius R7 (R7<R6) (m) from the sonar 80d, and a circle having a radius R5 (R5<R7) (m) from the sonar 80e.

Positions of a detection point 90k identified by combining circles centered on the sonar 80c and the sonar 80d, a detection point 90l identified by combining circles centered on the sonar 80d and the sonar 80e, and a detection point 90m identified by combining circles centered on the sonar 80c and the sonar 80e are different from each other, so that a position at which a centroid of a plurality of detection points including the detection point 90k, the detection point 90l, and the detection point 90mi is obtained is referred to as a representative detection point 90n. The position of the representative detection point 90n is different from the position of the representative detection point 90j illustrated in FIG. 7. The representative detection point 90n is positioned closer to the sonar 80g of the other vehicle that has performed transmission.

That is, in a case in which the received wave is the interference wave from the sonar of the other vehicle, regarding the estimated distances to the sonar 80c, the sonar 80d, and the sonar 80e of the own vehicle, the detection points are determined based on a time difference with respect to transmission performed by the sonar 80f and the sonar 80g of the other vehicle and distances from the sonar 80f and the sonar 80g of the other vehicle that perform transmission to the sonar 80c, the sonar 80d, and the sonar 80e of the own vehicle. Accordingly, the detection point appears at a position closer to the sonar of the other vehicle that has performed transmission, and when a plurality of pieces of the sonar of the other vehicle perform transmission in order, the coordinates of the detection point moves as if they are following the position of the sonar of the other vehicle that has performed transmission.

Figure 9:
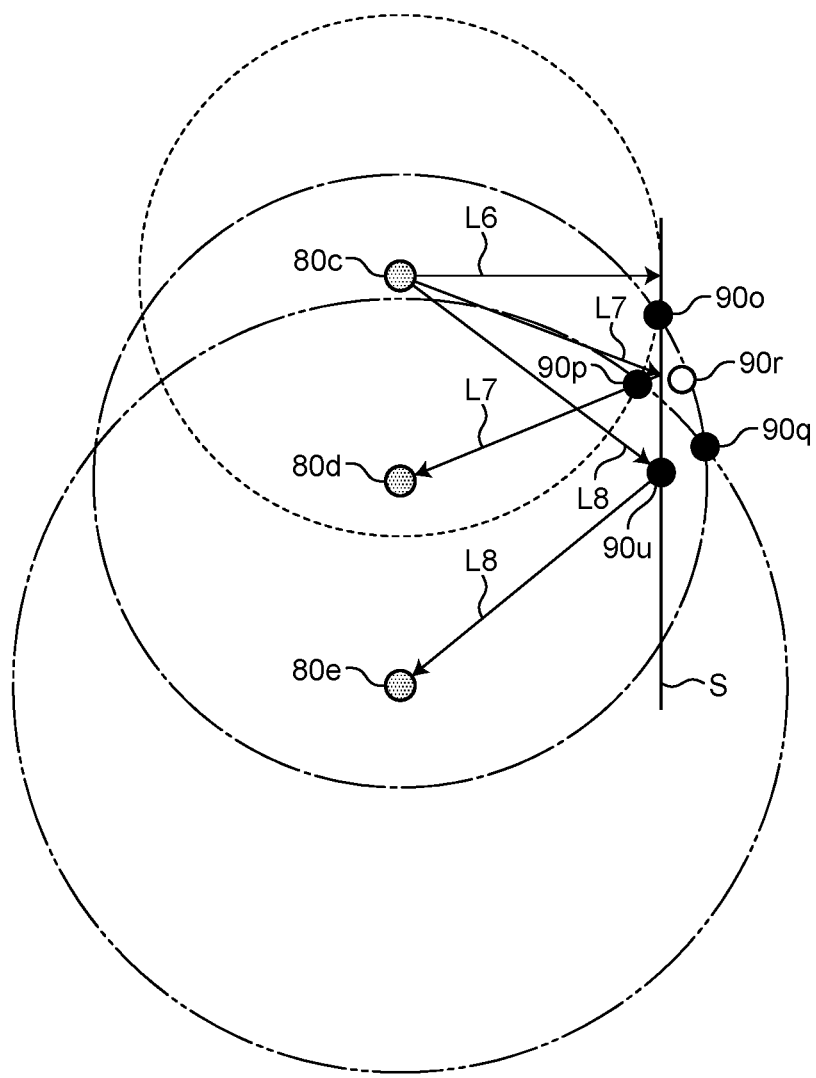
FIG. 9 is a diagram illustrating an example of detection coordinates identified by the sensor control device according to the embodiment.
Figure 10:
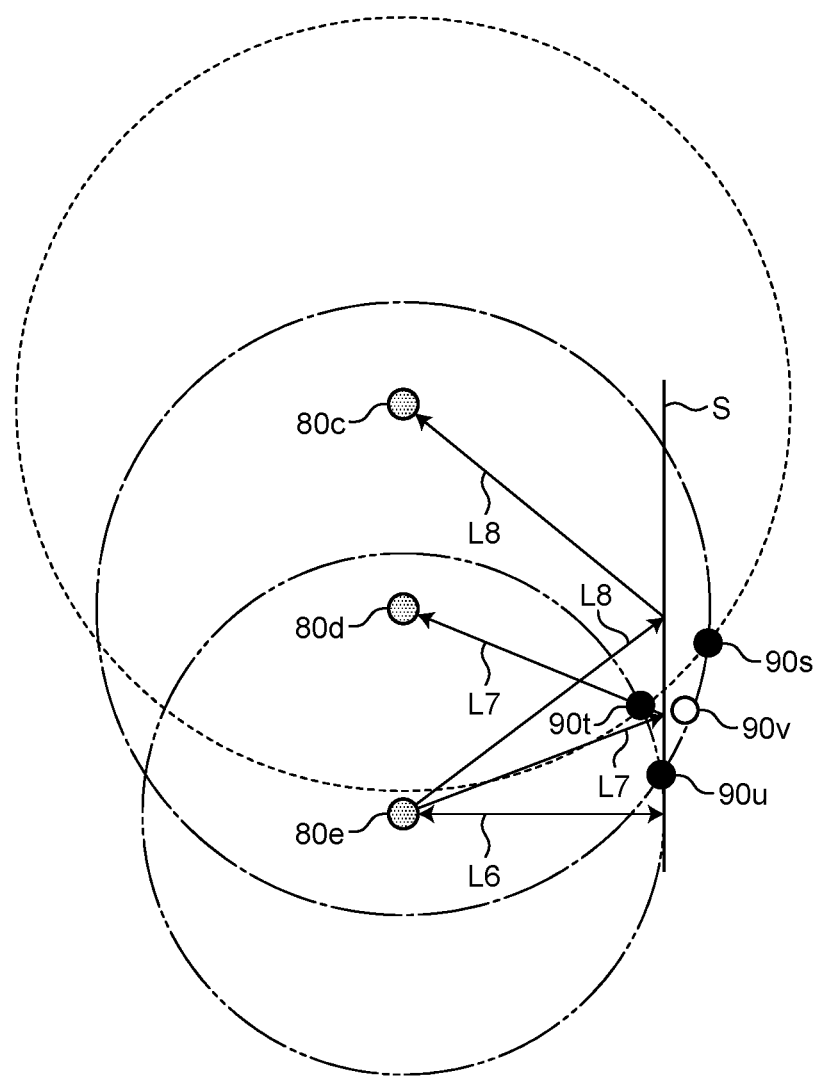
FIG. 10 is a diagram illustrating an example of detection coordinates identified by the sensor control device according to the embodiment.

The phenomenon that detection point coordinates are varied is, for example, caused for the detection point generated by the reflected wave at the time when the obstacle is a plane-shaped reflector, so that the following describes a difference from a sonar module of the other vehicle with reference to FIG. 9 and FIG. 10. FIG. 9 and FIG. 10 are diagrams illustrating examples of detection coordinates identified by the sensor control device according to the embodiment.

In a case in which the sound wave transmitted by the sonar 80c is reflected by a reflection surface S facing the sonar 80c, the sonar 80d, and the sonar 80e, assuming that a round-trip path length is 2L6 as to the sonar 80c, 2L7 as to the sonar 80d, and 2L8 as to the sonar 80e, the path length is prolonged when a path of the sound wave becomes oblique to a reflection surface, so that a path to the sonar 80e farther from the sonar 80c that has performed transmission becomes particularly long as represented by L8>L7>L6.

The estimated distance from the sonar 80e is calculated to be 2L8-L6, which is larger than the distance L8 to an actual reflection point, so that the detection point is identified to be a reflection point 90q closer to a side of the sonar 80c that has performed transmission than an actual reflection point 90u. As a result, a representative detection point 90r as a centroid of the detection points of the sonar 80c, the sonar 80d, and the sonar 80e is also positioned closer to the sonar 80c that has performed transmission.

Although not illustrated in the drawings, in a case in which the sonar 80d has performed transmission, the representative detection point is positioned in front of the sonar 80d. As illustrated in FIG. 10, in a case in which the sonar 80e has performed transmission, the representative detection point is positioned at 90v closer to the sonar 80e. That is, the phenomenon that the detection points vary is caused for the detection point generated by the reflected wave at the time when the obstacle is a plane-shaped reflector, for example. However, the position of the representative detection point varies depending on the position of the sonar that has performed transmission, and positioned to be closer to the position of the sonar that has performed transmission.

Thus, when subjected to hindrance from the sonar of the other vehicle, the position of the representative detection point becomes closer to the position of the sonar of the other vehicle that has performed transmission instead of the position of the sonar of the own vehicle that has performed transmission, so that a pattern of movement of the representative detection point is different between when subjected to hindrance from the sonar module of the other vehicle and when not subjected to hindrance.

Next, the following describes characteristics of a coordinates pattern when subjected to hindrance from the sonar module of the other vehicle with reference to FIG. 11, FIG. 12, FIG. 13, and FIG. 14. FIG. 11, FIG. 12, FIG. 13, and FIG. 14 are diagrams illustrating examples of the characteristics of the detection coordinates of the detection point in a case in which the sonar according to the embodiment is subjected to hindrance. In the graphs illustrated in FIG. 11, FIG. 12, FIG. 13, and FIG. 14, a horizontal axis (X-axis) indicates a distance (m) in a front and rear direction based on an own vehicle 2, and a vertical axis (Y-axis) indicates a distance (m) in a vehicle width direction based on the own vehicle 2. That is, the own vehicle 2 and the other vehicle 3 are viewed from above.

Each of broken lines illustrated in FIG. 11, FIG. 12, FIG. 13, and FIG. 14 is a locus of the position of the detection point identified from the received interference wave at the time when the other vehicle 3 moves forward in parallel with the X-axis in a state in which the sonar provided in the own vehicle 2 receives the interference wave transmitted from the sonar provided in the other vehicle 3. It is assumed that the sonic speed in FIG. 11, FIG. 12, FIG. 13, and FIG. 14 is 340 (m/s).

The following describes a case in which each of the own vehicle 2 and the other vehicle 3 includes four pieces of sonar provided on a front side of the vehicle. Specifically, the own vehicle 2 includes sonar 81a, sonar 81b, sonar 81c, and sonar 81d at intervals of 0.5 (m). The other vehicle 3 includes sonar 82a, sonar 82b, sonar 82c, and sonar 82d at intervals of 0.5 (m).

Next, the following describes a positional relation between the own vehicle 2 and the other vehicle 3. The own vehicle 2 and the other vehicle 3 have a positional relation of being opposed to each other. Specifically, coordinates of the sonar 81a, the sonar 81b, the sonar 81c, and the sonar 81d provided in the own vehicle 2 are positioned at the sonar 81a (0, 0), the sonar 81b (0, −1), the sonar 81c (0, −0.5), and the sonar 81d (0, −1.5) in FIG. 11, FIG. 12, FIG. 13, and FIG. 14.

Coordinates of the sonar 82a, the sonar 82b, the sonar 82c, and the sonar 82d provided in the other vehicle 3 are positioned at the sonar 82a (10, 2), the sonar 81b (10, 3), the sonar 81c (10, 2.5), and the sonar 81d (10, 3.5) in FIG. 11, FIG. 12, FIG. 13, and FIG. 14. The coordinates of the sonar provided in the other vehicle 3 move toward the Y-axis following the movement of the other vehicle.

Figure 11:
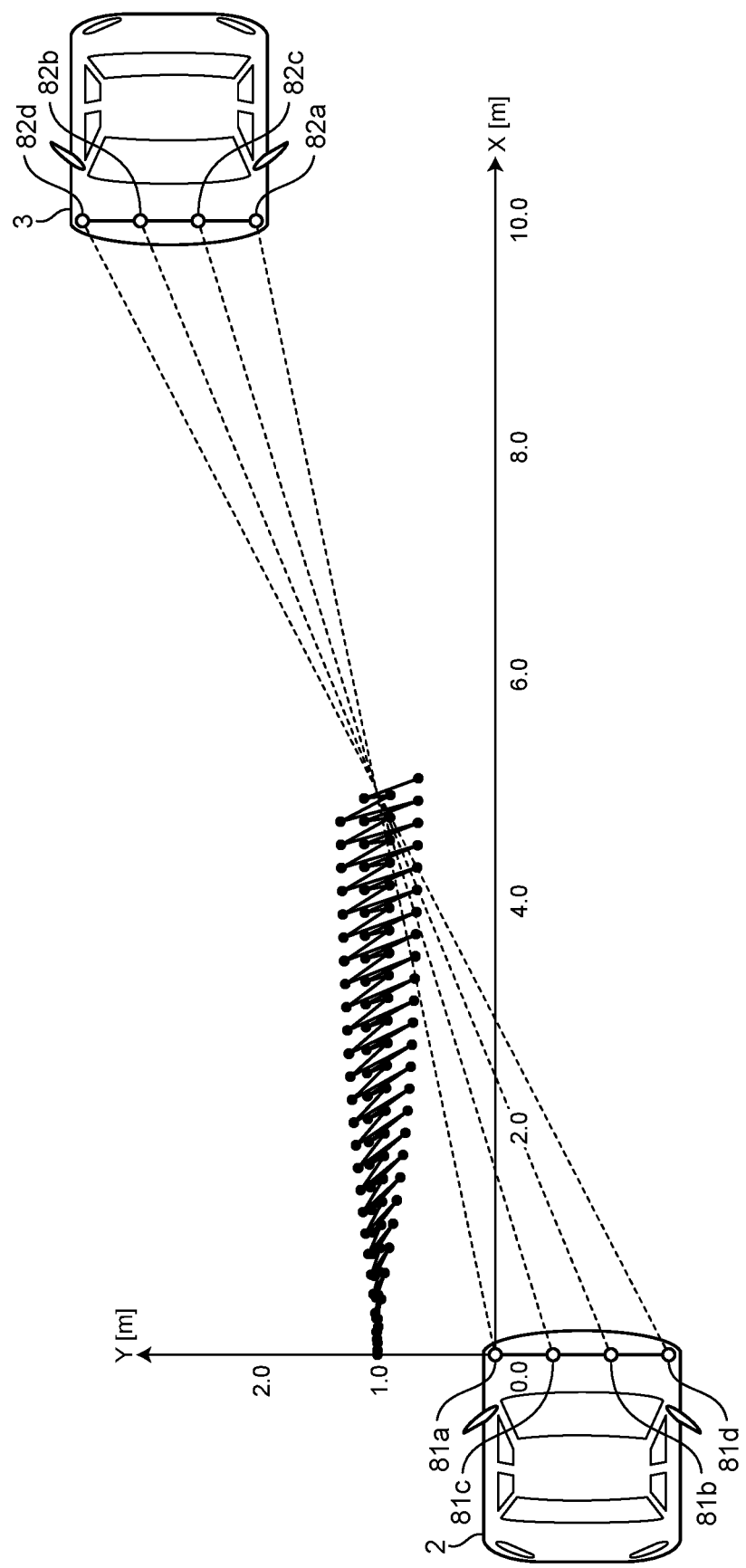
FIG. 11 is a diagram illustrating an example of a characteristic of detection coordinates of the detection point in a case in which the sonar according to the embodiment is subjected to hindrance.

Next, the following describes a transmission time and transmission order of transmitting the probing wave by the own vehicle 2 and the other vehicle 3. It is assumed that the transmission time at which pieces of the sonar of the own vehicle 2 and the other vehicle 3 perform transmission is the same in FIG. 11, FIG. 12, FIG. 13, and FIG. 14. In FIG. 11, the own vehicle 2 transmits the probing wave in order of the sonar 81a, the sonar 81b, the sonar 81c, and the sonar 81d.

Figure 12:
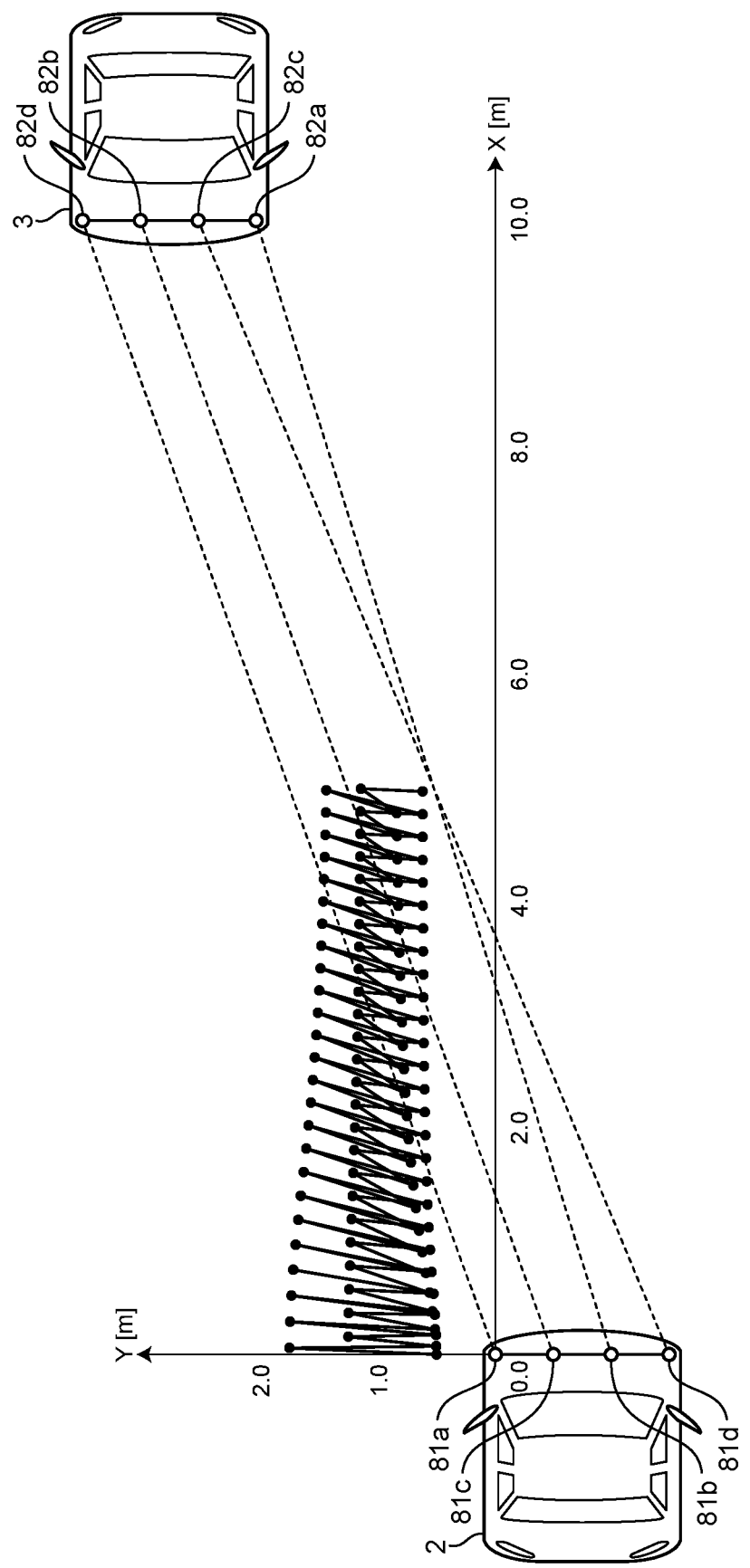
FIG. 12 is a diagram illustrating an example of a characteristic of detection coordinates of the detection point in a case in which the sonar according to the embodiment is subjected to hindrance.

In FIG. 12, the own vehicle 2 transmits the probing wave in order of the sonar 81b, the sonar 81c, the sonar 81d, and the sonar 81a.

Figure 13:
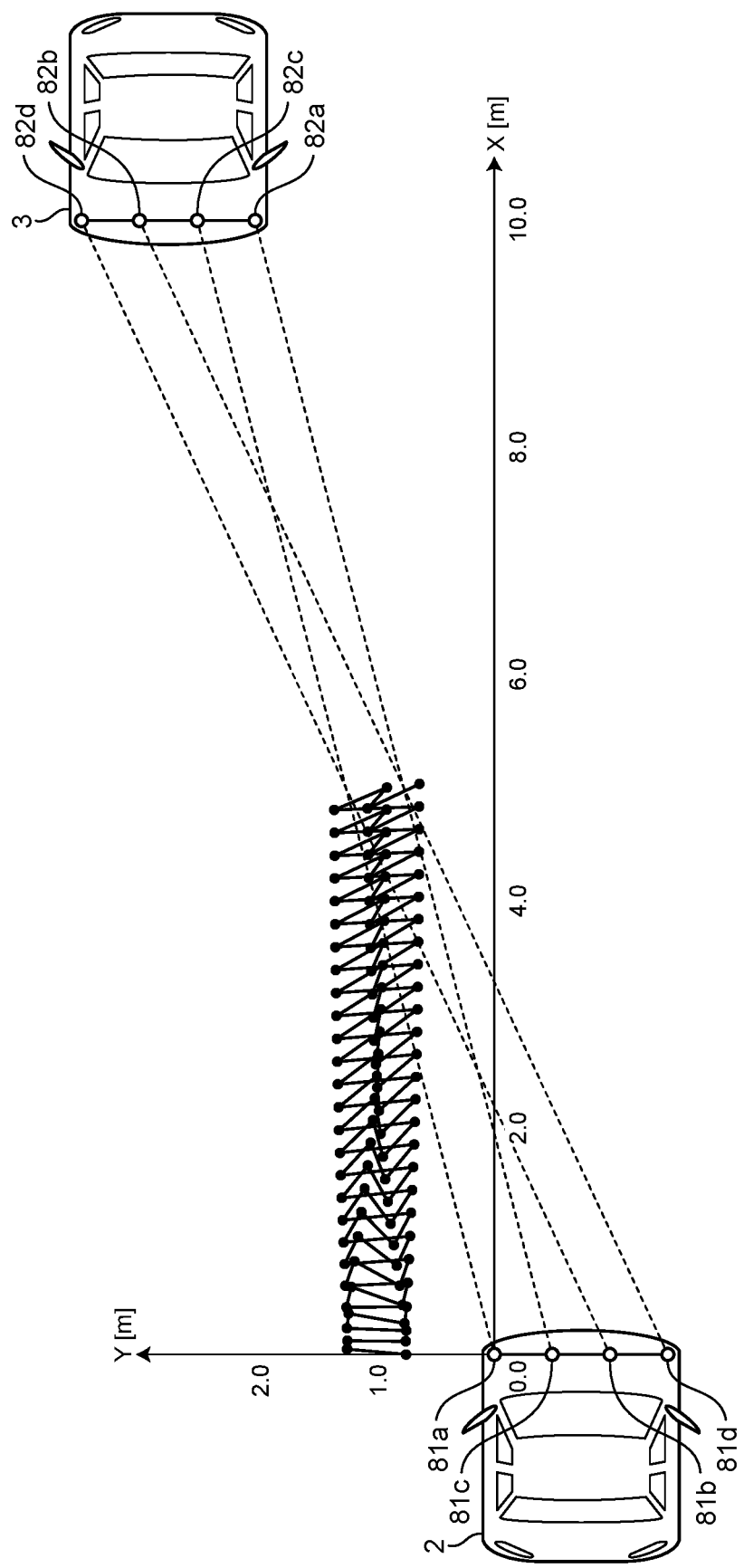
FIG. 13 is a diagram illustrating an example of a characteristic of detection coordinates of the detection point in a case in which the sonar according to the embodiment is subjected to hindrance.
Figure 14:
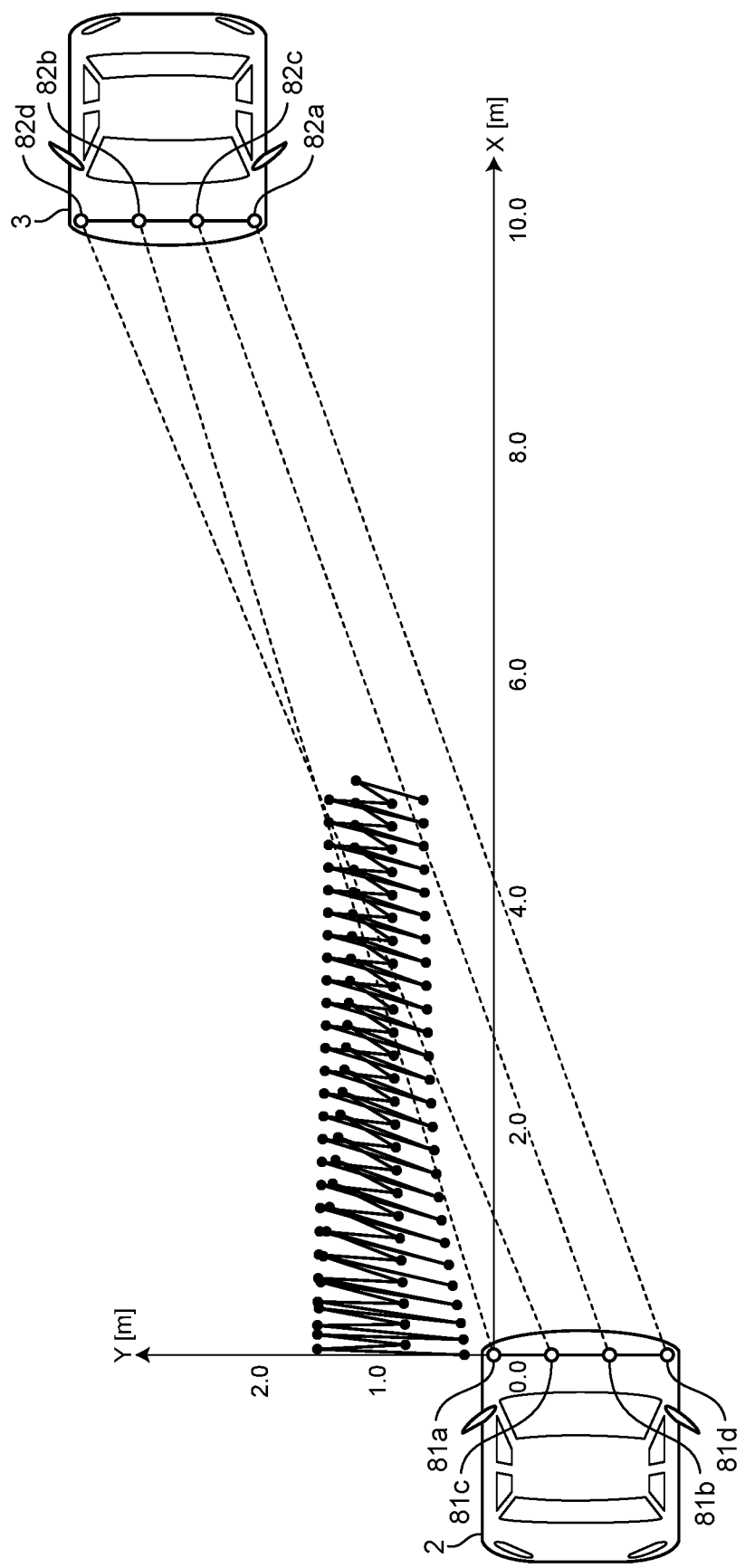
FIG. 14 is a diagram illustrating an example of a characteristic of detection coordinates of the detection point in a case in which the sonar according to the embodiment is subjected to hindrance.

In FIG. 13, the own vehicle 2 transmits the probing wave in order of the sonar 81c, the sonar 81d, the sonar 81a, and the sonar 81b. In FIG. 14, the own vehicle 2 transmits the probing wave in order of the sonar 81d, the sonar 81a, the sonar 81b, and the sonar 81c. In FIG. 11, FIG. 12, FIG. 13, and FIG. 14, the other vehicle 3 transmits the probing wave in order of the sonar 82a, the sonar 82b, the sonar 82c, and the sonar 82d.

Next, the following describes tracking of the detection point identified by the own vehicle 2. FIG. 11, FIG. 12, FIG. 13, and FIG. 14 illustrate a locus of the detection point in a case in which a relative distance between the own vehicle 2 and the other vehicle 3 on the X-axis is changed from 10 (m) to 0 (m).

The coordinates of the detection point are identified by the own vehicle 2 assuming that the received wave is the reflected wave, which is the probing wave transmitted by the sonar of the own vehicle and reflected by the obstacle, as described above. That is, the position of the sonar of the own vehicle that has performed transmission is a starting point for calculating the detection point coordinates. However, in a situation of receiving the interference wave, the detection point coordinates appear at a position closer to the sonar of the other vehicle that has transmitted the interference wave. As a result, in a case in which the transmission time of the other vehicle and the own vehicle is the same, the detection point appears in the vicinity of a middle point of a line segment both ends of which are a combination of the sonar of the own vehicle and the sonar of the other vehicle that have performed transmission at the same time.

In a case of FIG. 11, line segments both ends of which are a combination of the sonar of the own vehicle and the sonar of the other vehicle that have performed transmission at the same time intersect with each other at one point, and an intersection point is the middle point, so that the detection point appears at a relatively converged position. In a case of FIG. 12, the line segments both ends of which are a combination of the sonar of the own vehicle and the sonar of the other vehicle that have performed transmission at the same time do not intersect with each other except one pair. As a result, the detection points vary more largely than the case of FIG. 11. In a case of FIG. 13, there are two middle points of the line segments both ends of which are a combination of the sonar of the own vehicle and the sonar of the other vehicle that have performed transmission at the same time. As a result, convergence is lowered as compared with the case of FIG. 11, but variation of the detection points is reduced as compared with the case of FIG. 12.

In a case of FIG. 14, similarly to the case of FIG. 12, the line segments both ends of which are a combination of the sonar of the own vehicle and the sonar of the other vehicle that have performed transmission at the same time do not intersect with each other except one pair. As a result, the detection points largely vary similarly to the case of FIG. 12. In this way, in the situation of receiving the interference wave, the phenomenon occurs such that the detection point moves while depicting a locus (movement pattern) depending on the combination of the sonar of the own vehicle and the sonar of the other vehicle that have performed transmission at the same time.

FIG. 15 is a diagram extracting part of loci of the detection points in a case in which the sonar illustrated in FIG. 11, FIG. 12, FIG. 13, and FIG. 14 described above is subjected to hindrance, and comparing the locus (movement pattern) of the detection point in a case in which the sonar according to the embodiment is subjected to hindrance with the locus (movement pattern) of the detection point when receiving a reflected wave from a plane-shaped reflector. In FIG. 15, regarding transmission order of the interference wave transmitted by the other vehicle 3, the following describes a case in which the probing wave is transmitted in order of the sonar 82$a$, the sonar 82$b$, the sonar 82$c$, and the sonar 82$d$.

As illustrated in the first column in FIG. 15, in a case in which the sonar of the own vehicle 2 transmits the probing wave in transmission order of the sonar 81$a$, the sonar 81$b$, the sonar 81$c$, and the sonar 81$d$, the position of the detection point when approaching the plane-shaped reflector is changed in order of a detection point 811$a$, a detection point 811$b$, a detection point 811$c$, and a detection point 811$d$ corresponding to the position of the sonar of the own vehicle 2. On the other hand, in a case in which the detection point is a ghost generated by the interference wave transmitted from the other vehicle 3, the position of the detection point is changed in order of a detection point 821$a$, a detection point 821$b$, a detection point 821$c$, and a detection point 821$d$ corresponding to the position of the sonar of the other vehicle 3.

Focusing on the first movement of the detection point, by comparing movement from the detection point 811$a$ to the detection point 811$b$ with movement from the detection point 821$a$ to the detection point 811$b$, it can be found that a direction in which the detection point moves is reversed. Regarding both of the second detection point to the third detection point, and the third detection point to the fourth detection point, a moving direction is also reversed, so that it can be found that the movement pattern is different between a case of the interference wave and a case of the reflected wave.

As illustrated in the second column in FIG. 15, in a case in which the sonar of the own vehicle 2 transmits the probing wave in transmission order of the sonar 81$b$, the sonar 81$c$, the sonar 81$d$, and the sonar 81$a$, the position of the detection point when approaching the plane-shaped reflector is changed in order of the detection point 811$b$, the detection point 811$c$, the detection point 811$d$, and the detection point 811$a$ corresponding to the position of the sonar of the own vehicle 2. On the other hand, in a case in which the detection point is a ghost generated by the interference wave transmitted from the other vehicle 3, the position of the detection point is changed in order of the detection point 821$a$, the detection point 821$b$, the detection point 821$c$, and the detection point 821$d$ corresponding to the position of the sonar of the other vehicle 3.

In a case of the reflected wave from the plane-shaped reflector, a movement amount from the third detection point to the fourth detection point is larger than a movement amount of the other times. The position of the detection point varies to be closer to the sonar that performs transmission, so that the movement amount at the time when the sonar of the own vehicle that performs transmission is changed from a right end to a left end becomes larger than the movement amount at the other times. In a case in which the detection point is a ghost generated by the interference wave transmitted from the other vehicle 3, the movement amount at the time when the sonar of the other vehicle that performs transmission is changed from the right end to the left end becomes larger than the movement amount at the other times. In a case of the second column in FIG. 15, a time of movement from the fourth detection point to the fifth detection point is a time when the sonar of the other vehicle that performs transmission is changed from the right end to the left end, that is, a time when the movement amount is the largest, so that it can be found that the movement pattern is different between the case of the interference wave and the case of the reflected wave.

Furthermore, as illustrated in the third column in FIG. 15, in a case in which the sonar of the own vehicle 2 transmits the probing wave in transmission order of the sonar 81$c$, the sonar 81$d$, the sonar 81$a$, and the sonar 81$b$, the position of the detection point when approaching the plane-shaped reflector is changed in order of the detection point 811$c$, the detection point 811$d$, the detection point 811$a$, and the detection point 811$b$ corresponding to the position of the sonar of the own vehicle 2.

On the other hand, in a case in which the detection point is a ghost generated by the interference wave transmitted from the other vehicle 3, the position of the detection point is changed in order of the detection point 821$a$, the detection point 821$b$, the detection point 821$c$, and the detection point 821$d$ corresponding to the position of the sonar of the other vehicle 3. Similarly to the example of the first column, the moving direction from the first detection point to the second detection point, from the second detection point to the third detection point, and from the third detection point to the fourth detection point is reversed, and it can be found that the movement pattern is different between the case of the interference wave and the case of the reflected wave.

As illustrated in the fourth column in FIG. 15, in a case in which the sonar of the own vehicle 2 transmits the probing wave in transmission order of the sonar 81$d$, the sonar 81$a$, the sonar 81$b$, and the sonar 81$c$, the position of the detection point when approaching the plane-shaped reflector is changed in order of the detection point 811$d$, the detection point 811$a$, the detection point 811$b$, and the detection point 811$c$ corresponding to the position of the sonar of the own vehicle 2.

On the other hand, in a case in which the detection point is a ghost generated by the interference wave transmitted from the other vehicle 3, the position of the detection point is changed in order of the detection point 821$c$, the detection point 821$d$, the detection point 821$a$, and the detection point 821$b$ corresponding to the position of the sonar of the other vehicle 3. Similarly to the example of the second column, in a case of the reflected wave from the plane-shaped reflector, the movement amount from the first detection point to the second detection point is larger than the movement amount at the other times, but in a case of the interference wave, the movement from the fourth detection point to the fifth detection point is larger than the movement amount at the other times, so that it can be found that the movement pattern is different between the case of the interference wave and the case of the reflected wave.

When the movement pattern of the position of the detection point in the vehicle width direction (Y-axis) is the same as the movement pattern of the position of transmission sonar of the own vehicle 2, the ghost likelihood evaluation means 706 evaluates that the received wave is not the interference wave but the reflected wave from the plane-shaped reflector. On the other hand, in a case in which the movement pattern of the position of the detection point in the vehicle width direction (Y-axis) is different from the movement pattern of the position of the transmission sonar of the own vehicle 2, the ghost likelihood evaluation means 706 evaluates the likelihood that the received wave is the interference wave from the sonar of the other vehicle to be high.

The movement pattern of the detection point depends on an order difference between transmission order of the sonar of the own vehicle 2 and the transmission order of the sonar of the other vehicle 3, and a time difference between transmission times thereof. Transmission performed by four pieces of the sonar is repeated as one period, so that the order difference and the time difference can be collectively represented as a phase difference when the one period is associated with 360 degrees, and a transmission interval is associated with 90 degrees. For example, regarding the sonar of the own vehicle 2, in a case in which the phase difference is close to a multiple of 90 degrees, the transmission times of the sonar of the own vehicle 2 and the sonar of the other vehicle 3 are close to each other, so that the detection point (ghost) generated by the interference wave appears between the own vehicle 2 and the other vehicle 3.

In a case in which the phase difference is close to a multiple of 90 degrees, the ghost appears in the vicinity of a middle point between the own vehicle 2 and the other vehicle 3. In a case in which there is a little time difference in the transmission time, the ghost appears at a point slightly closer, from the middle point, to the vehicle the transmission time of which is later. In a case in which the time difference in the transmission time is longer than a one-way time during which the sound wave is transmitted between the own vehicle 2 and the other vehicle 3, the ghost appears at a position farther from the other vehicle 3, so that it can be said that there is substantially no influence from the interference wave.

Among cases in which the phase difference is 0 degrees, 90 degrees, 180 degrees, and 270 degrees, a combination of the sonar of the own vehicle 2 and the sonar of the other vehicle 3 that perform transmission substantially at the same time is changed, so that the movement pattern of the detection point is different depending on the phase difference (transmission order) as illustrated by the broken lines in FIG. 11, FIG. 12, FIG. 13, and FIG. 14, or loci of the detection point generated by the interference wave of the other vehicle 3 in the table of FIG. 15.

Thus, the ghost likelihood evaluation means 706 stores, in a storage unit, movement patterns of the detection point in a case in which the phase difference influenced by the interference wave is a multiple of 90 degrees, and in a case in which the movement pattern is close to any of the stored movement patterns of the detection point, the ghost likelihood evaluation means 706 evaluates that there is a likelihood of the interference wave.

For example, in a case in which a movement pattern indicated by the movement amount and the moving direction of the detection point generated when a plurality of transmitter-receivers of the other vehicle successively perform transmission corresponds to a movement pattern indicated by the movement amount and the moving direction identified by the detection point tracking means, in other words, in a case in which the movement pattern of the detection point corresponds to the movement pattern in a case in which the detection point is a ghost, the ghost likelihood may be evaluated to be high.

Figure 16:
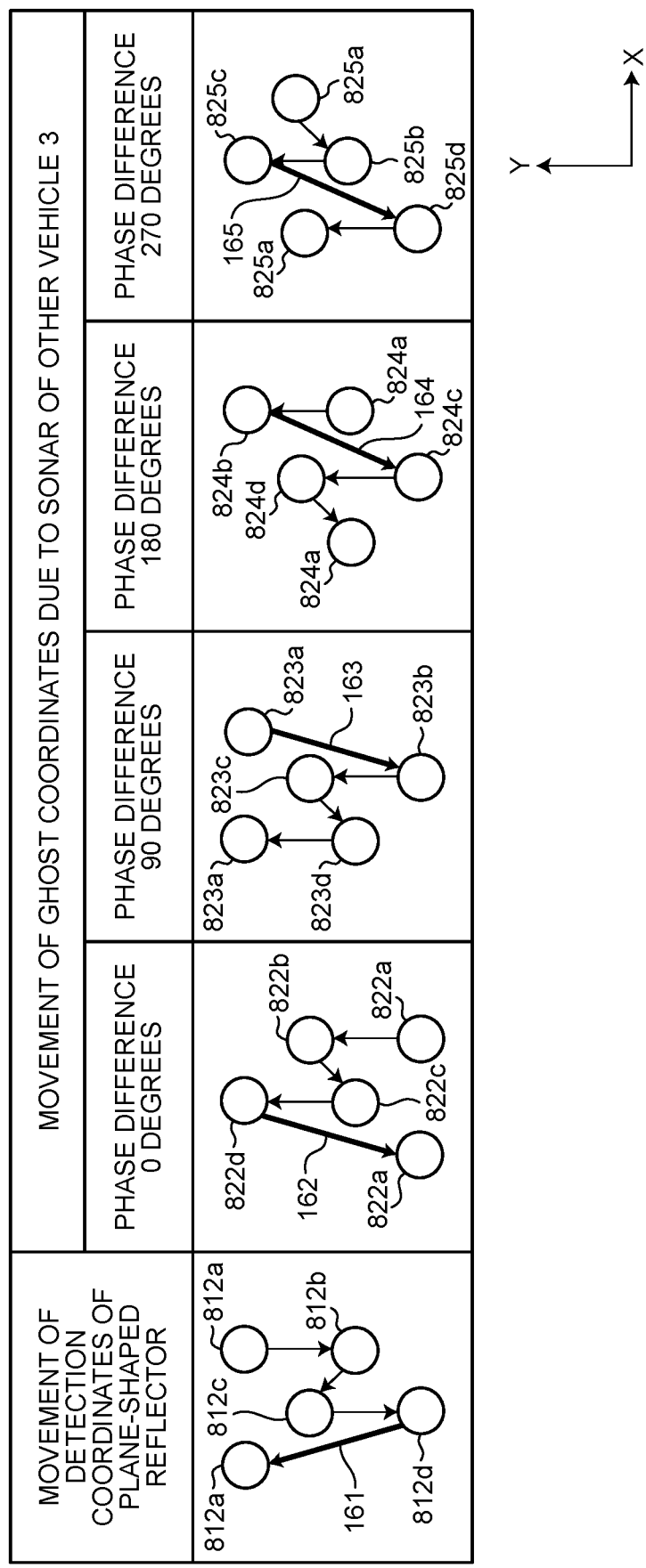
FIG. 16 is a table illustrating an example of characteristics of detection coordinates of the detection point in a case in which the sonar according to the embodiment is subjected to hindrance and the detection point identified by the sensor control device.
Figure 17:
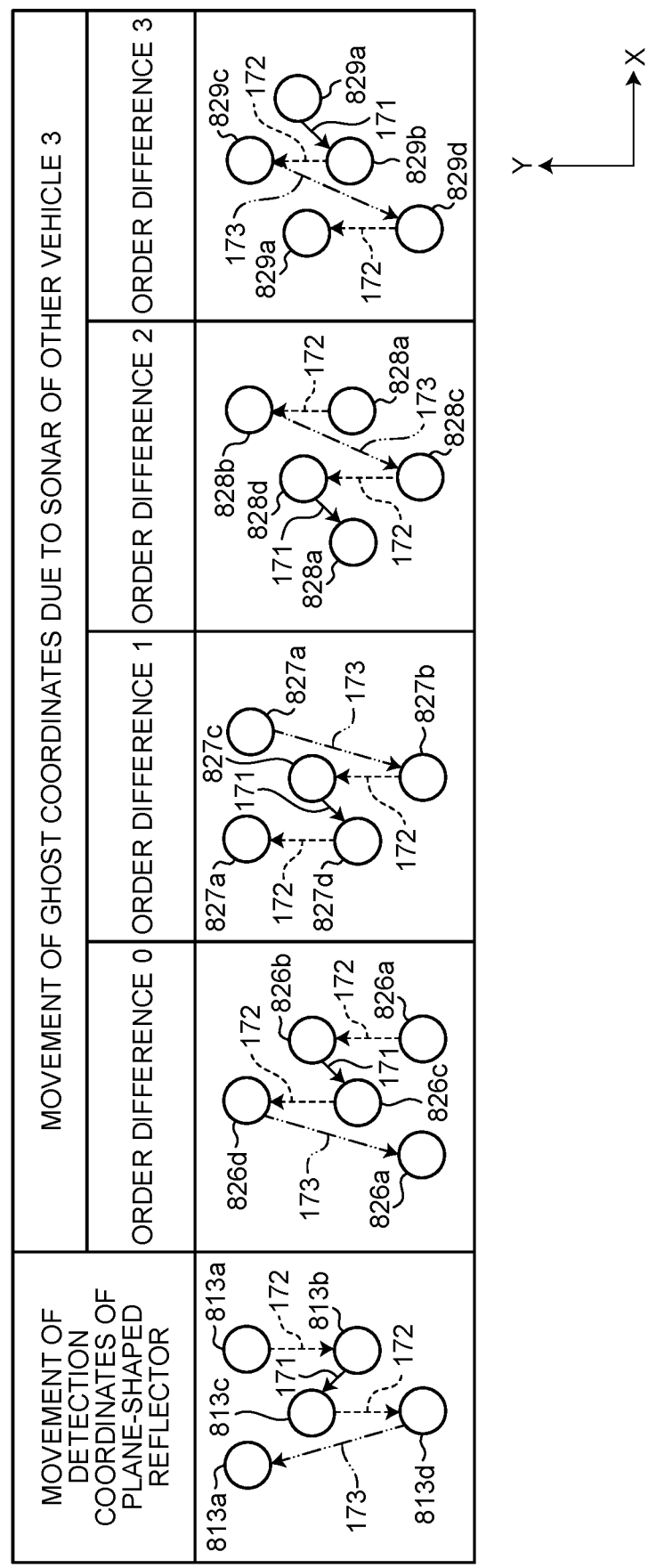
FIG. 17 is a table illustrating an example of characteristics of detection coordinates of the detection point in a case in which the sonar according to the embodiment is subjected to hindrance and the detection point identified by the sensor control device.

The following describes the movement patterns to be stored in the storage unit with reference to FIG. 16 and FIG. 17. FIG. 16 and FIG. 17 are tables illustrating examples of characteristics of the detection coordinates of the detection point identified by the sensor control device in a case in which the sonar according to the embodiment is subjected to hindrance.

The tables of the movement patterns illustrated in FIG. 16 and FIG. 17 illustrate, in a case in which the sonar of the own vehicle 2 transmits the probing wave in transmission of the sonar 81*a*, the sonar 81*b*, the sonar 81*c*, and the sonar 81*d*, movement of detection coordinates of the reflected wave from the plane-shaped reflector and movement of ghost coordinates generated by the sonar of the other vehicle 3. The horizontal axis (X-axis) indicates the traveling direction of the own vehicle 2 and the other vehicle 3, and the vertical axis (Y-axis) indicates the vehicle width direction of the own vehicle 2 and the other vehicle 3. That is, the own vehicle 2 and the other vehicle 3 are viewed from above.

In FIG. 16, to focus on the moving direction and a timing when the movement amount of the detection point becomes the largest, an arrow indicating movement corresponding thereto is represented by a thick line. In FIG. 16, the detection coordinates identified from the reflected wave from the plane-shaped reflector is written as detection coordinates of the plane-shaped reflector.

As illustrated in FIG. 16, the detection coordinates of the plane-shaped reflector move in order of a detection point 812*a*, a detection point 812*b*, a detection point 812*c*, and a detection point 812*d* as one period. A largest movement amount 161 of the detection coordinates of the plane-shaped reflector becomes the largest in a case in which the detection point moves from the detection point 812*d* to the detection point 812*a* in a positive direction of the Y-axis.

In a case in which the phase difference is 0 degrees, the ghost coordinates generated by the sonar of the other vehicle 3 move in order of a detection point 822*a*, a detection point 822*b*, a detection point 822*c*, and a detection point 822*d* as one period. A largest movement amount 162 of the detection coordinates of the ghost coordinates generated by the sonar of the other vehicle 3 becomes the largest in a case in which the detection point moves from the detection point 822*d* to the detection point 822*a* in a negative direction of the Y-axis.

Next, in a case in which the phase difference is 90 degrees, the ghost coordinates generated by the sonar of the other vehicle 3 move in order of a detection point 823*a*, a detection point 823*b*, a detection point 823*c*, and a detection point 823*d* as one period. A largest movement amount 163 of the detection coordinates of the ghost coordinates generated by the sonar of the other vehicle 3 becomes the largest in a case in which the detection point moves from the detection point 823*a* to the detection point 822*b* in the negative direction of the Y-axis.

Next, in a case in which the phase difference is 180 degrees, the ghost coordinates generated by the sonar of the other vehicle 3 move in order of a detection point 824*a*, a detection point 824*b*, a detection point 824*c*, and a detection point 824*d* as one period. A largest movement amount 164 of the detection coordinates of the ghost coordinates generated by the sonar of the other vehicle 3 becomes the largest in a case in which the detection point moves from the detection point 824*b* to the detection point 824*c* in the negative direction of the Y-axis.

Next, in a case in which the phase difference is 270 degrees, the ghost coordinates generated by the sonar of the other vehicle 3 move in order of a detection point 825*a*, a detection point 825*b*, a detection point 825*c*, and a detection point 825*d* as one period. A largest movement amount 163 of the detection coordinates of the ghost coordinates generated by the sonar of the other vehicle 3 becomes the largest in a case in which the detection point moves from the detection point 823*a* to the detection point 822*b* in the negative direction of the Y-axis.

The following focuses on the moving direction in a case in which the movement amount of the detection point coordinates in the vehicle width direction becomes the largest. The moving direction of the detection coordinates of the plane-shaped reflector is the positive direction of the Y-axis, but the moving direction of the ghost coordinates generated by the sonar of the other vehicle 3 is the negative direction of the Y-axis. These moving directions are different and reverse to each other. Thus, the ghost likelihood evaluation means 706 evaluates the ghost likelihood to be high when the moving direction in a case in which the movement amount of the detection point coordinates in the vehicle width direction becomes the largest is different from the moving direction of the detection coordinates of the plane-shaped reflector, specifically, reverse to the moving direction of the detection coordinates of the plane-shaped reflector.

Subsequently, as illustrated in FIG. 17, the detection coordinates of the plane-shaped reflector move in order of a detection point 813*a*, a detection point 813*b*, a detection point 813*c*, and a detection point 813*d* as one period. The following also describes the moving direction of the detection coordinates of the plane-shaped reflector. Specifically, the moving direction from the detection point 813*a* to the detection point 813*b* is the negative direction of the Y-axis, the moving direction from the detection point 813*b* to the detection point 813*c* is the positive direction of the Y-axis, the moving direction from the detection point 813*c* to the detection point 813*d* is the negative direction of the Y-axis, and the moving direction from the detection point 813*d* to the detection point 813*a* is the positive direction of the Y-axis.

Next, the following describes movement of the ghost coordinates generated by the sonar of the other vehicle 3. An order difference in the movement of the ghost coordinates generated by the sonar of the other vehicle 3 illustrated in FIG. 17 indicates a difference in order of transmitting the probing wave by the sonar provided in the own vehicle 2. Specifically, an order difference 0 is caused in a case in which the sonar 81*a* and the sonar 82*a* transmit the probing wave first. An order difference 1 is caused in a case in which the sonar 81*a* and the sonar 82*b* transmit the probing wave first. An order difference 2 is caused in a case in which the sonar 81*a* and the sonar 82*c* transmit the probing wave first. An order difference 3 is caused in a case in which the sonar 81*a* and the sonar 82*d* transmit the probing wave first.

In FIG. 17, to focus on the moving direction and the movement amount of the detection point at the same time (order), different forms of arrow lines (a solid line, a dotted line, and a two-dot chain line) are used, and arrows indicating movement at the same time (order) are represented in the same form. In FIG. 17, the detection coordinates identified from the reflected wave from the plane-shaped reflector is written as detection coordinates of the plane-shaped reflector.

In a case of the order difference 0, the ghost coordinates generated by the sonar of the other vehicle 3 move in order of a detection point 826*a*, a detection point 826*b*, a detection point 826*c*, and a detection point 826*d* as one period. In a case of the order difference 0, regarding the moving direction of the ghost coordinates generated by the sonar of the other vehicle 3, the moving direction from the detection point 826*a* to the detection point 826*b* is the positive direction of the Y-axis, the moving direction from the detection point 826*b* to the detection point 826*c* is the negative direction of the Y-axis, the moving direction from the detection point 826*c* to the detection point 826*d* is the positive direction of the Y-axis, and the moving direction from the detection point 826*d* to the detection point 826*a* is the negative direction of the Y-axis.

In a case of the order difference 1, the ghost coordinates generated by the sonar of the other vehicle 3 move in order of a detection point 827*a*, a detection point 827*b*, a detection point 827*c*, and a detection point 827*d* as one period. In a case of the order difference 1, regarding the moving direction of the ghost coordinates generated by the sonar of the other vehicle 3, the moving direction from the detection point 827*a* to the detection point 827*b* is the negative direction of the Y-axis, the moving direction from the detection point 827*b* to the detection point 827*c* is the positive direction of the Y-axis, the moving direction from the detection point 827*c* to the detection point 827*d* is the negative direction of the Y-axis, and the moving direction from the detection point 827*d* to the detection point 827*a* is the positive direction of the Y-axis.

Subsequently, in a case of the order difference 2, the ghost coordinates generated by the sonar of the other vehicle 3 move in order of a detection point 828*a*, a detection point 828*b*, a detection point 828*c*, and a detection point 828*d* as one period. In a case of the order difference 2, regarding the moving direction of the ghost coordinates generated by the sonar of the other vehicle 3, the moving direction from the detection point 828*a* to the detection point 828*b* is the positive direction of the Y-axis, the moving direction from the detection point 828*b* to the detection point 828*c* is the negative direction of the Y-axis, the moving direction from the detection point 828*c* to the detection point 828*d* is the positive direction of the Y-axis, and the moving direction from the detection point 828*d* to the detection point 828*a* is the negative direction of the Y-axis.

Subsequently, in a case of the order difference 3, the ghost coordinates generated by the sonar of the other vehicle 3 move in order of a detection point 829*a*, a detection point 829*b*, a detection point 829*c*, and a detection point 829*d* as one period. In a case of the order difference 1, regarding the moving direction of the ghost coordinates generated by the sonar of the other vehicle 3, the moving direction from the detection point 829*a* to the detection point 829*b* is the negative direction of the Y-axis, the moving direction from the detection point 829*b* to the detection point 829*c* is the positive direction of the Y-axis, the moving direction from the detection point 829*c* to the detection point 829*d* is the negative direction of the Y-axis, and the moving direction from the detection point 829*d* to the detection point 829*a* is the positive direction of the Y-axis.

Regarding order differences in the movement of the detection coordinates of the plane-shaped reflector and the movement of the ghost coordinates generated by the sonar of the other vehicle 3, when orientations in the Y-axis direction are compared with each other, the orientations in the Y-axis direction are reverse to each other in a case in which the order difference is an even number (the order difference 0 and the order difference 2), but the orientations in the Y-axis direction are the same in a case in which the order difference is an odd number (the order difference 1 and the order difference 3).

The following describes the movement amount of the detection coordinates in the Y-axis direction. It is assumed that movement amounts of the detection coordinates in the Y-axis direction are a movement amount 171, a movement amount 172, and a movement amount 173, and magnitude of the movement amount is represented as the movement amount 171<the movement amount 172<the movement amount 173. In FIG. 17, the movement amount from the detection point 813*a* to the detection point 813*b* is the movement amount 172, the movement amount from the detection point 813*b* to the detection point 813*c* is the movement amount 171, the movement amount from the detection point 813c to the detection point 813d is the movement amount 172, and the movement amount from the detection point 813d to the detection point 813a is the movement amount 173.

The movement amount from the detection point 826a to the detection point 826b is the movement amount 172, the movement amount from the detection point 826b to the detection point 826c is the movement amount 171, the movement amount from the detection point 826c to the detection point 826d is the movement amount 172, and the movement amount from the detection point 826d to the detection point 826a is the movement amount 173. Furthermore, the movement amount from the detection point 827a to the detection point 827b is the movement amount 173, the movement amount from the detection point 827b to the detection point 827c is the movement amount 172, the movement amount from the detection point 827c to the detection point 827d is the movement amount 171, and the movement amount from the detection point 827d to the detection point 827a is the movement amount 172.

The movement amount from the detection point 828a to the detection point 828b is the movement amount 172, the movement amount from the detection point 828b to the detection point 828c is the movement amount 173, the movement amount from the detection point 828c to the detection point 828d is the movement amount 172, and the movement amount from the detection point 828d to the detection point 828a is the movement amount 171. Furthermore, the movement amount from the detection point 829a to the detection point 829b is the movement amount 171, the movement amount from the detection point 829b to the detection point 829c is the movement amount 172, the movement amount from the detection point 829c to the detection point 829d is the movement amount 172, and the movement amount from the detection point 829d to the detection point 829a is the movement amount 172.

Regarding order differences in the movement of the detection coordinates of the plane-shaped reflector and the movement of the ghost coordinates generated by the sonar of the other vehicle 3, when the movement amounts are compared with each other, the movement amounts do not match at all four times in a case in which the order difference is an odd number (the order difference 1 and the order difference 3).

Thus, the ghost likelihood evaluation means 706 may evaluate the ghost likelihood to be high when including at least one of the case in which the orientations in the Y-axis direction (vehicle width direction) of the moving direction of the detection coordinates are reverse to each other (the order difference is an even number) and the case in which the movement amounts of the detection coordinates do not match at all four times (the order difference is an odd number).

That is, the ghost likelihood may be evaluated to be high in a case in which the movement pattern indicated by the movement amount and the moving direction of the detection point generated when the transmission/reception control means 710 (described later) causes the transmitter-receivers to successively transmit carrier waves does not correspond to the movement pattern indicated by the movement amount and the moving direction identified by the detection point tracking means 705. This can also be said that the ghost likelihood is evaluated to be high when the movement pattern of the detection point does not correspond to the movement pattern of the detection point in a case in which the received carrier wave is the reflected wave from the obstacle.

Next, the following describes the ghost likelihood based on a characteristic of the reception waveform. The ghost likelihood evaluation means 706 evaluates the ghost likelihood to be high in a case in which the characteristic of the reception waveform indicating a temporal change of a strength with which the transmitter-receiver receives the carrier wave do not correspond to a characteristic in a case in which the carrier wave is the reflected wave from the obstacle. As described above, the carrier wave herein is the sound wave. The following describes a reception strength when subjected to hindrance from the sonar of the other vehicle with reference to FIG. 18.

Figure 18:
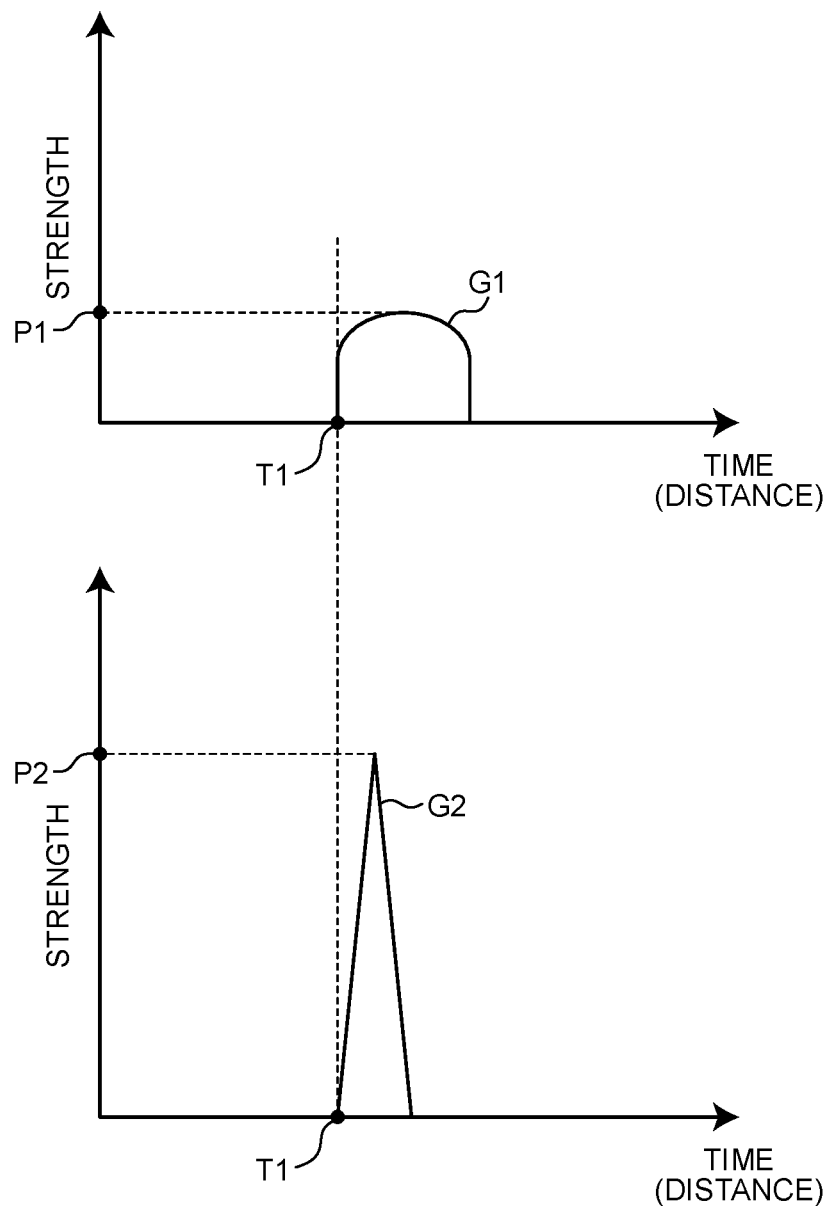
FIG. 18 is a graph for comparing examples of a reception strength in a case in which the sonar according to the embodiment is subjected to hindrance and a reception strength in a case in which the sensor control device performs reception.

FIG. 18 is a graph for comparing examples of the reception strength in a case in which the sonar according to the embodiment is subjected to hindrance and the reception strength in a case in which the sensor control device performs reception. In the graph illustrated in FIG. 18, a horizontal axis indicates a time (distance), and a vertical axis indicates a strength (dB), that is, a sound wave reception strength. A graph G1 indicates a reception waveform of the reflected wave reflected by the object. Furthermore, a graph G2 indicates a reception waveform when receiving a sound wave transmitted from the other vehicle.

First, the sound wave transmitted from the sonar is weakened due to a propagation loss in which the strength is lowered when the sound wave propagates in the air, and a diffusion loss in which the strength is lowered when a wave front spreads. However, the sonar transmits the sound wave while giving directivity thereto so that the sound wave reaches a place as far as possible, so that this sound wave is less attenuated due to diffusion than a sound wave having no directivity and emitted in all directions. However, when the sound wave hits an object, part of energy of the sound wave is lost inside the object or on a surface thereof, and residual energy is emitted as a reflected wave having low directivity.

That is, when the carrier wave travels back and forth a distance to the object, the diffusion loss per unit distance is larger on a return route on which the carrier wave becomes the reflected wave than an outward route on which the directivity is high. On the other hand, the interference wave directly reaches a receiver without being reflected by any object while keeping the directivity, so that the reflected wave is typically weaker than the interference wave.

Thus, the ghost likelihood may be evaluated to be high in a case in which a peak strength of a peak waveform corresponding to the detection point appears in the reception waveform is larger than an expected strength in a case in which the carrier wave travels back and forth the distance to the detection point. The expected strength is reduced depending on the distance, so that a threshold for determining that the peak strength is larger than the expected strength may be set as a function of the distance. The propagation loss in the air varies due to a temperature or humidity, so that the temperature or humidity may be incorporated in the function to correct the threshold. Alternatively, a difference between the peak strength and the expected strength may be obtained without setting the threshold, and as an amount of the peak strength exceeding the expected strength is larger, the ghost likelihood may be evaluated to be higher.

In a case in which a surface shape of the object is a plane, a ratio of returning as the reflected wave is increased. However, a distance from the sonar is different among positions within the surface and distributed in a far-and-near direction, so that energy of the reflected wave is dispersed in a time axis direction. Particularly, a situation in which interference becomes a problem is a situation in which the own vehicle faces the other vehicle, and a front surface of the vehicle body is not a uniform plane but has a shape having a three-dimensional depth, so that the energy of the reflected wave tends to be dispersed in the time axis direction. Thus, the graph G1 representing the reception waveform of the reflected wave depicts a low and gentle dome shape, for example.

On the other hand, the sound wave (interference wave) transmitted from the other vehicle is not reflected on its way, so that it is not dispersed on an object surface or is not dispersed in the time axis direction in the air. Accordingly, the graph G2 representing the reception waveform of the interference wave depicts a peak waveform having a high and sharp spike shape, that is, a waveform having a high degree of steepness, for example.

Thus, in a case in which the degree of steepness of the reception waveform corresponds to a degree of steepness in a case in which the detection point is a ghost, the ghost likelihood may be evaluated to be high. The degree of steepness of the reception waveform is dispersion (spread of a width of a portion the strength of which is high) in the time axis direction of the peak waveform that appears corresponding to the detection point in the reception waveform, for example, and the degree of steepness may be evaluated by a half-value width. The half-value width is a width between two points at which the strength becomes a half of the peak strength before and after a peak. The ghost likelihood may be evaluated to be high when the half-value width is smaller than a threshold, or the ghost likelihood may be evaluated to be higher as the half-value width is smaller without setting the threshold.

When setting the threshold, the half-value width in a case in which the received carrier wave (received wave) is the reflected wave depends on the shape of the object, so that the half-value width at the time when the object is various vehicles may be obtained, and the threshold may be experimentally set. In the present embodiment, the ghost likelihood is comprehensively evaluated while taking into account a plurality of characteristics, so that reliability of each evaluation is not necessarily pursued.

For example, the sonar 21 and the sonar 22 of the own vehicle receive the interference wave transmitted from the other vehicle, the ghost likelihood evaluation means 706 evaluates the reception strength or the degree of steepness of the peak waveform using, as a comparison target, when assuming that the received wave travels back and forth a distance from the sonar of the own vehicle to the detection point, and determines that the reception strength is larger than that of the comparison target, or the degree of steepness is higher than that of the comparison target. Based on an evaluation result thereof, it can be said that the strength and the degree of steepness correspond to the strength or the degree of steepness in a case in which the detection point is a ghost, so that the ghost likelihood of the detection point is evaluated to be high.

Alternatively, it can also be said that the ghost likelihood of the detection point is evaluated to be high in a case in which the peak strength of the received wave is larger than a strength that is expected when the carrier wave travels back and forth a distance to the detection point, or in a case in which the degree of steepness of the peak waveform is higher than a degree of steepness that is expected when dispersion is caused by reflection.

The ghost likelihood evaluation means 706 may obtain a difference between the peak strength of the peak waveform corresponding to the detection point on the reception waveform and a strength that is expected when the received wave is the probing wave reflected by the detection point, evaluate the ghost likelihood to be higher as an amount of the peak strength exceeding a strength that is expected when the probing wave reflected by the detection point is received is larger, or evaluate the ghost likelihood to be higher as a half-value width of the peak waveform corresponding to the detection point on the reception waveform is smaller.

Next, the following describes another detection point different from the concerned detection point, a direction and a speed of the other detection point being correlated with those of the concerned detection point. This other detection point different from the concerned detection point is a detection point obtained by detecting, by the reflected wave, the other vehicle that generates a ghost. The following describes a correlation between an approaching speed of the ghost generated by the sonar of the other vehicle and an approaching speed of the detection point of the other vehicle.

Herein, it is assumed that an actual distance between the own vehicle and the other vehicle is L, a sonic speed is M, and a time difference from when the own vehicle performs transmission until the sonar of the other vehicle performs transmission is Dt when pieces of the sonar of the own vehicle and the other vehicle transmit sound waves. A time from a time point when the sound wave is transmitted to a time point when the sound wave is received is referred to as a flight time (FT). When the other vehicle performs transmission delaying from transmission performed by the own vehicle by Dt, a time from a time point when the sonar module of the own vehicle performs transmission until the interference wave is received is L/M+Dt, which is larger than an actual flight time (L/M) by Dt. On the other hand, the flight time of the reflected wave received by the sonar module of the own vehicle is 2L/M, the reflected wave being the sound wave transmitted from the sonar module of the own vehicle and reflected by the other vehicle.

The sonar module calculates a distance assuming that the sound wave travel back and forth, so that conversion is made such that the distance L=FT (flight time)×M (sonic speed)/2. As a result, a change amount of the distance to the ghost when the distance L to the other vehicle varies is evaluated to be a half of a change amount of the distance to the other vehicle. If the change amount of the distance per time is replaced by the speed, the approaching speed of the ghost is a half of the approaching speed of the other vehicle.

Based on the approaching speed of the ghost, the approaching speed of the other vehicle is substantially two times the approaching speed of the ghost. The ghost appears on a line substantially connecting the other vehicle with the own vehicle, so that a direction in which the ghost appears is substantially the same as a direction of the other vehicle. If an overall moving direction of the ghost is identified by averaging periodic movement patterns of the detection point depending on transmission order of the sonar, the overall moving direction is also substantially the same as the moving direction of the other vehicle obtained based on the reflected wave, so that these may be added to an evaluation condition for the ghost likelihood.

That is, when an oncoming vehicle as the other vehicle is detected, and there is a detection point approaching at a substantially half speed of the approaching speed of the oncoming vehicle in the direction of the oncoming vehicle, the detection point may be a ghost with high possibility, so that the ghost likelihood evaluation means 706 evaluates the ghost likelihood to be high. When this process is generalized while considering an error, it can also be said that the ghost likelihood of the concerned detection point is evaluated to be high in a case in which there is the other detection point that is present in substantially the same direction as the concerned detection point identified by the detection point identification means and moves at a speed substantially two times the moving speed of the concerned detection point in substantially the same direction as the concerned detection point. Alternatively, it can also be said that the ghost likelihood of the concerned detection point is evaluated to be high in a case in which there is the other detection point different from the concerned detection point, the direction and the speed of the other detection point being correlated with those of the concerned detection point.

Return to FIG. 4. The detection number determination means 707 determines whether the number of detections is equal to or larger than 8, for example. A case in which the number of detections is equal to or larger than 8 is a case in which, when the vehicle 1 includes four pieces of sonar, each of the four pieces of sonar detects the detection point two times or more, for example. In this case, if the number of detections is equal to or larger than 8, ghost likelihood can be evaluated based on the movement pattern of the detection point.

For example, the ghost likelihood addition means 708 adds up ghost likelihood evaluation values evaluated by the ghost likelihood evaluation means 706 during four times of detection in the latest period, and outputs the ghost likelihood. This processing assumes that the vehicle 1 causes the four pieces of sonar to periodically operate. Depending on a relation between the direction of the oncoming vehicle and a direction of the sonar that performs transmission, the detection point suspected to be a ghost is not detected in some cases at a specific time among four times of detection in one period. Accordingly, in a case in which such a positional relation is present, the ghost likelihood evaluation value is not calculated for the detection point at the specific time, so that the ghost likelihood evaluation value varies in one period including four times of detection.

Thus, for example, by causing a total value of the ghost likelihood evaluation values during four times of detection in the latest period to be the ghost likelihood, processing of stabilizing the ghost likelihood is additionally performed. For example, the ghost likelihood evaluation means 706 associates the ghost likelihood evaluation value of the detection point identified by the detection point identification means 703 with the detection point to be stored in the RAM 11C in FIG. 2. The ghost likelihood addition means 708 reads out a time series of the detection point that is determined to be the same as a detection point in the past by the detection point tracking means 705 and the ghost likelihood evaluation value associated with the detection point over a predetermined period (for example, four times of detection in the latest period), and adds up read-out ghost likelihood evaluation values to be the ghost likelihood.

However, the exemplified processing of adding up the ghost likelihood evaluation values is not essential, and the latest ghost likelihood evaluation value may be used as the ghost likelihood. The ghost likelihood evaluation means 706 may additionally output the ghost likelihood evaluation value when the detection point satisfies a specific condition. In this case, the ghost likelihood addition means 708 adds the additional ghost likelihood evaluation value as a bonus.

In a case in which the ghost likelihood addition means 708 is not present, an output from the ghost likelihood evaluation means 706 may be referred to as the ghost likelihood. Also in a case in which an output from the ghost likelihood addition means 708 is referred to as the ghost likelihood, and the output from the ghost likelihood evaluation means 706 is referred to as the ghost likelihood evaluation value, the ghost likelihood evaluation value may be simply referred to as the ghost likelihood.

The ghost likelihood threshold setting means 709 sets a ghost likelihood threshold corresponding to the ghost likelihood in accordance with a distance between the vehicle 1 and the detection point. The ghost likelihood threshold setting means 709 also sets the ghost likelihood threshold in accordance with a vehicle speed indicating a speed at which the vehicle 1 travels. Furthermore, the ghost likelihood threshold setting means 709 sets the ghost likelihood threshold in accordance with an adverse effect evaluated by the adverse effect evaluation means 713 (described later), or increase or decrease of the adverse effect. The ghost likelihood threshold may be set to be lower as the distance is shorter, and may be set to be lower as the vehicle speed is higher. Detailed description will be provided later.

Means for decreasing the adverse effect is not limited to changing the ghost likelihood threshold. The adverse effect may be decreased by increasing or decreasing evaluation of the ghost likelihood. The adverse effect evaluation means 713 (described later) may evaluate the adverse effect based on at least one of conditions such that the direction of the detection point is the same as the traveling direction of the vehicle, the distance to the detection point tends to reduce, a speed reduction of the detection point is large, the distance to the detection point is small, and the traveling speed of the vehicle is high, and may evaluate the ghost likelihood in accordance with the adverse effect evaluated by the adverse effect evaluation means 713 or increase or decrease of the adverse effect.

For example, two processes may be performed in combination, the two processes including: an adjustment process of evaluating the ghost likelihood or setting the ghost likelihood threshold in accordance with the distance between the vehicle and the detection point, and causing a transmission interval of the carrier wave to be more easily changed as the distance is shorter; and an adjustment process of evaluating the ghost likelihood or setting the ghost likelihood threshold in accordance with the vehicle speed indicating the speed at which the vehicle travels, and causing the transmission interval of the carrier wave to be more easily changed as the vehicle speed is higher.

The transmission/reception control means 710 controls timings at which the transmitter-receivers mounted on the vehicle perform transmission. Alternatively, it can also be said that the transmission/reception control means 710 changes the transmission interval of the probing wave in a case in which the ghost determination means 714 (described later) determines that the ghost likelihood is larger than the ghost likelihood threshold. The transmission/reception control means 710 may change the transmission interval to be shorter in a case in which a collision margin time until the vehicle collides with the obstacle is smaller than a predetermined collision margin time threshold.

Figure 19:
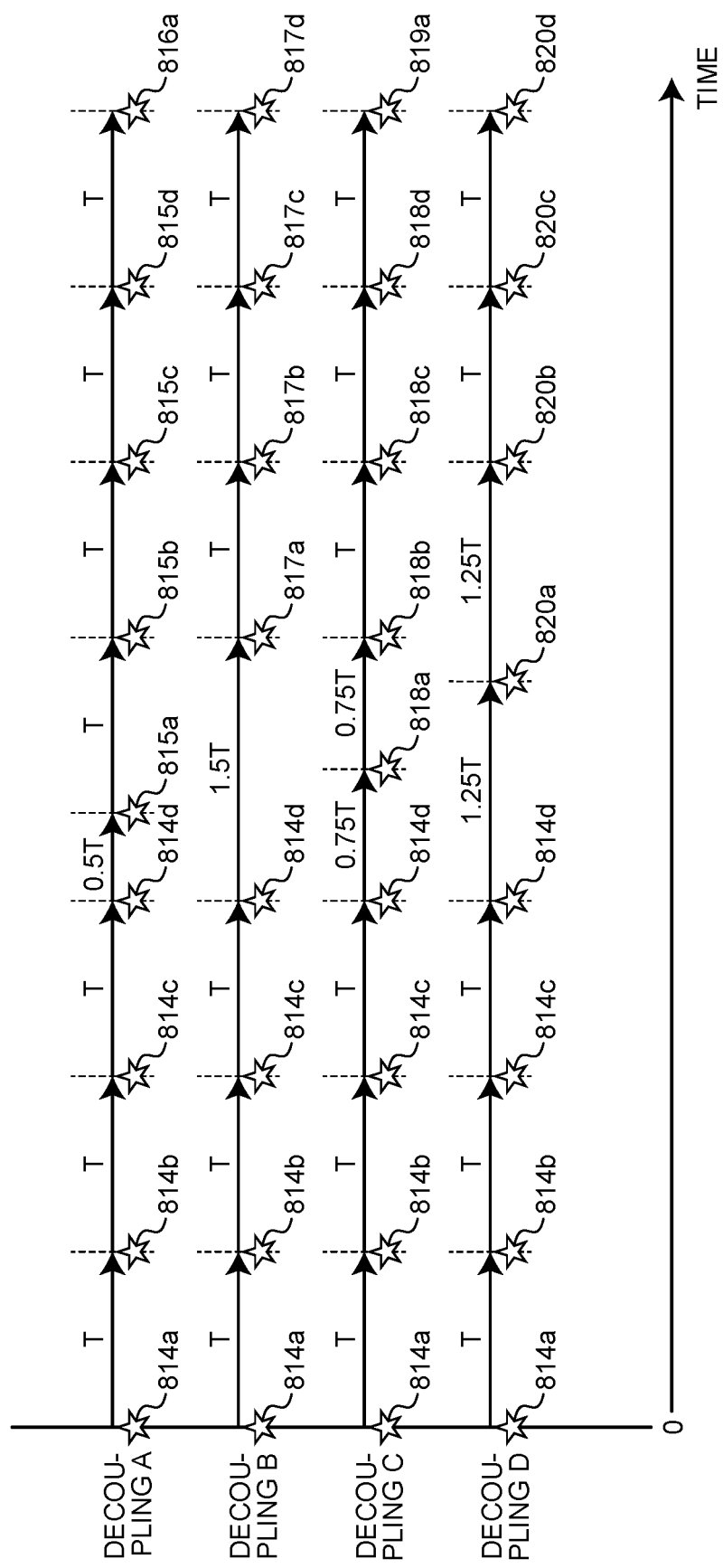
FIG. 19 is a timing chart illustrating an example of a timing at which the sensor control device according to the embodiment controls a probing wave.

Next, the following describes means for performing decoupling processing by the transmission/reception control means 710 with reference to FIG. 19. FIG. 19 is a timing chart illustrating an example of a timing at which the sensor control device according to the embodiment controls the transmitter-receiver to transmit the probing wave.

In a case in which the ghost determination means 714 (described later) determines that the ghost likelihood is larger than the predetermined ghost likelihood threshold, the transmission/reception control means 710 changes the transmission interval of the probing wave. Changing the transmission interval of the probing wave is also referred to as the decoupling processing. The decoupling processing is processing of eliminating a state in which a transmission phase of transmission from the own vehicle is close to a phase of the interference wave transmitted from the other vehicle by shifting the transmission timing of the own vehicle. Performing the decoupling processing may be abbreviated as decoupling.

Herein, it is assumed that the sonar of the own vehicle performs transmission at transmission intervals T. FIG. 19 illustrates times at which the sonar of the own vehicle performs transmission. Specifically, the times at which the sonar of the own vehicle performs transmission are assumed to be a time 814*a*, a time 814*b*, a time 814*c*, a time 814*d*, a time 815*a*, a time 815*b*, a time 815*c*, a time 815*d*, a time 816*a*, a time 817*a*, a time 817*b*, a time 817*c*, a time 817*d*, a time 818*a*, a time 818*b*, a time 818*c*, a time 818*d*, a time 819*a*, a time 820*a*, a time 820*b*, a time 820*c*, and a time 820*d*.

A typical state in which interference is caused is a state in which the sonar of the own vehicle and the sonar of the other vehicle perform transmission with a time difference 0T (that is, at the same time). An operation of causing this state to be a state in which the sonar of the own vehicle and the sonar of the other vehicle perform transmission with a time difference 0.5T (that is, alternately) is the decoupling processing, for example. As a method for shifting the transmission timing of the sonar of the own vehicle by 0.5T, the transmission/reception control means 710 may perform any one of transmission timing control processes indicated as decoupling A, decoupling B, decoupling C, and decoupling D, for example.

Specifically, in a case of the decoupling A, one time of transmission at transmission intervals of 0.5T is inserted. In a case of the decoupling B, one time of transmission at transmission intervals of 1.5T is inserted. In a case of the decoupling C, two times of transmission at transmission intervals of 0.75T are inserted. In a case of the decoupling D, two times of transmission at transmission intervals of 1.25T are inserted. Assuming that the sonar of the own vehicle and the sonar of the other vehicle are in a state of performing transmission with the time difference 0T (that is, at the same time) at the time when the time is 0 in FIG. 19, in any of the cases of the decoupling A to the decoupling D, the state where the sonar of the own vehicle and the sonar of the other vehicle perform transmission with the time difference 0.5T (that is, alternately) is reached after a time of temporarily changing the transmission interval ends (for example, the last time point illustrated therein).

The transmission interval influences a detectable distance. For example, when the transmission interval is set to be 0.5T like the decoupling A, when receiving the reflected wave 0.6T after the transmission, it cannot be discriminated whether the obstacle is present at a position where FT=0.6T is satisfied, or the obstacle is present at a position where FT=0.1T is satisfied. That is, when the transmission interval is shortened, the obstacle cannot be detected in a range satisfying FT>the transmission interval.

For example, in a case in which the obstacle is present at a position where FT=0.6T is satisfied, and movement thereof is tracked, the obstacle cannot be detected at a time when the transmission interval is made 0.5T, so that processing is temporarily performed assuming that the obstacle is not detected. In the tracking processing, tracking of the obstacle that has not been detected at multiple continuous times is ended, and lost determination (disappearance determination) is performed to perform processing assuming that the obstacle is not detected. Thus, in a case in which the obstacle is not detected for some reason before and after the time at which the transmission interval is shortened, lost determination may be caused due to influence of the decoupling processing.

Thus, when the transmission interval is changed from 1T to 0.75T like the decoupling C, an undetectable range is narrowed due to shortening of the transmission interval as compared with the case in which the transmission interval is changed from 1T to 0.5T, so that an adverse effect on tracking can be suppressed. For example, in a case in which the obstacle is present at a position where FT=0.6T is satisfied, and movement thereof is tracked, detection is not interrupted and tracking can be continued because a range in which the obstacle cannot be detected is a range of FT>0.75T.

In contrast, when the transmission interval is lengthened like the decoupling B or the decoupling D, the obstacle is prevented from being undetectable due to a change of the transmission interval. However, the number of detections per unit time is reduced when the transmission interval is lengthened, so that a timing of detection or automatic braking may be delayed. The number of times of changing the transmission interval is not limited to one or two, but may be made three or more to further suppress a change amount of the transmission interval.

Figure 20:
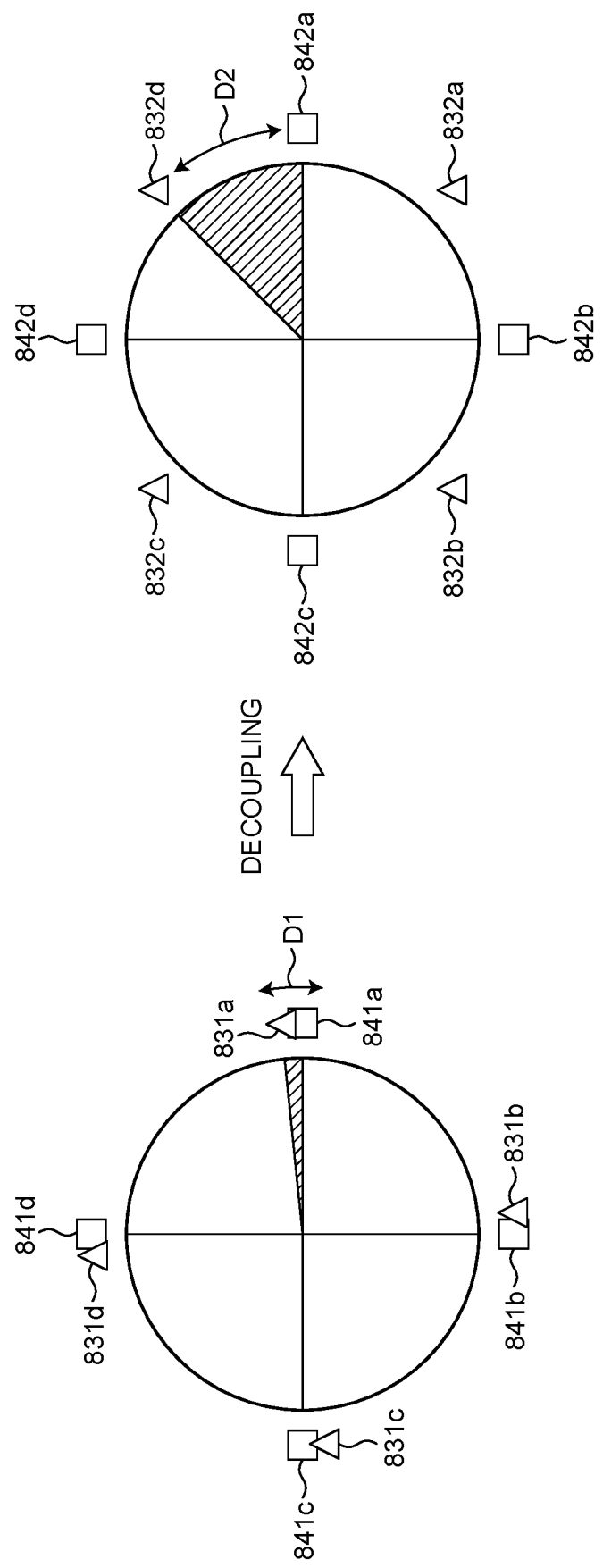
FIG. 20 is a diagram illustrating a phase difference before and after the sensor control device according to the embodiment controls the proving wave.

Subsequently, the following describes an effect of performing the decoupling processing with reference to FIG. 20. FIG. 20 illustrates phases of transmission performed by the sonar of the other vehicle and the sonar of the own vehicle before and after decoupling is performed. Transmission phases of transmission performed by the sonar of the own vehicle are assumed to be a transmission phase 841*a*, a transmission phase 841*b*, a transmission phase 841*c*, a transmission phase 841*d*, a transmission phase 842*a*, a transmission phase 842*b*, a transmission phase 842*c*, and a transmission phase 842*d*. Transmission phases of transmission performed by the sonar of the other vehicle are assumed to be a transmission phase 831*a*, a transmission phase 831*b*, a transmission phase 831*c*, a transmission phase 831*d*, a transmission phase 832*a*, a transmission phase 832*b*, a transmission phase 832*c*, and a transmission phase 832*d*.

First, as a state before decoupling, it is assumed that the sonar of the own vehicle and the sonar of the other vehicle perform transmission substantially at the same time. In this case, the transmission phases of the sonar of the own vehicle and the sonar of the other vehicle are the transmission phase 841*a*, the transmission phase 841*b*, the transmission phase 841*c*, the transmission phase 841*d*, the transmission phase 831*a*, the transmission phase 831*b*, the transmission phase 831*c*, and the transmission phase 831*d*, respectively. The phases are close to each other. In this case, the sonar of the own vehicle is in a state of being subjected to hindrance from the sonar of the other vehicle.

For example, in a case in which the sonic speed is 340 (m/s) and the transmission interval of the own vehicle is 100 (ms), when the transmitted sound wave is reflected by an object at a distance of 17 (m), the sound wave is returned after FT=100 (ms). That is, 17 ($m$) is a maximum detection distance that is determined based on the transmission interval. Assuming that a distance to the oncoming vehicle is 17 (m) and a time difference of transmission is 0, in a case before the decoupling, the interference wave is returned after 50 (ms), so that detection is performed as if the obstacle is present at a distance of 8.5 m. This detection point at the distance of 8.5 m is a ghost, and a state in which the ghost is appearing is a state in which the sonar of the own vehicle is subjected to hindrance from the sonar of the other vehicle.

When the transmission/reception control means 710 shifts the transmission interval of the own vehicle and performs the decoupling processing, the transmission phases of the sonar of the own vehicle and the sonar of the other vehicle are a transmission phase 842*a*, a transmission phase 842*b*, a transmission phase 842*c*, a transmission phase 842*d*, a transmission phase 832*a*, a transmission phase 832*b*, a transmission phase 832*c*, and a transmission phase 832*d*, respectively. The phases are distant from each other by about 45 degrees.

For example, assuming that a transmission time difference is 50 (ms), when a distance to the oncoming vehicle is 17 (m), the sound wave transmitted from the own vehicle makes a round-trip by 34 (m) and is returned after 100 (ms). The sound wave (interference wave) transmitted by the own vehicle is transmitted 50 (ms) after the own vehicle performs transmission and flies one way 17 (m) for 50 (ms), so that the interference wave is returned at the same time as the reflected wave. Accordingly, the distance at which the obstacle is detected due to influence of the interference wave becomes the same as the distance detected with the reflected wave, that is, 17 (m).

In this case, a ghost does not appear at a position closer than the oncoming vehicle, so that it can be said that this state is a state of (substantially) not being subjected to hindrance. In a case in which the distance to the oncoming vehicle is 1.7 (m), the reflected wave is returned after 10 (ms), and a direct wave is returned after 60 (ms). Accordingly, the distance=10.2 (m) at which the ghost appears due to the interference wave becomes farther than the distance=1.7 (m) detected by the reflected wave, so that the ghost does not become a target of emergency braking. That is, when decoupling is performed, the ghost caused by the interference wave moves away to a distance farther than the oncoming vehicle, so that erroneous braking is not caused by the interference wave.

As described above, the ghost is not eliminated even when decoupling is performed, but the detection point will not appear at the position where the ghost has appeared. A position where a new ghost appears is a position where actual damage is not caused for the obstacle detection device aiming at collision avoidance, so that it can be said that hindrance is eliminated. However, in a case in which the received sound wave is not the interference wave but the reflected wave, the position of the detection point is not changed before and after decoupling. That is, decoupling also functions as means for definitely determining whether the detection point is a ghost or an obstacle as a real object.

Return to FIG. 4. The collision determination means 711 determines collision possibility indicating the possibility that the detection point meets the vehicle 1 and the obstacle corresponding to the detection point collides with the vehicle 1. For example, a route of the detection point detected by the detection point identification means 703 and identified by the detection point tracking means 705 meets a scheduled route of the vehicle 1, or approaches with each other by a distance corresponding to the vehicle width, the collision determination means 711 determines presence/absence of the collision possibility for the obstacle corresponding to the detection point and the vehicle 1.

The collision margin time calculation means 712 calculates a collision margin time until the detection point meets the vehicle 1. Specifically, in a case in which the collision determination means 711 determines that there is the collision possibility of the obstacle corresponding to the detection point and the vehicle 1, the collision margin time calculation means 712 calculates the collision margin time until the obstacle meets the vehicle 1.

In a case in which the collision determination means 711 determines that there is no collision possibility of the obstacle corresponding to the detection point and the vehicle 1, the collision margin time calculation means 712 may cause the collision margin time to be a maximum value as a numerical value (by way of example, 255 seconds).

The adverse effect evaluation means 713 evaluates the adverse effect caused by changing the transmission interval of the probing wave. Specifically, the adverse effect evaluation means 713 evaluates the adverse effect based on at least one of conditions such that the direction of the detection point is the same as the traveling direction of the vehicle 1, the distance to the detection point tends to reduce, a speed reduction of the detection point is large, the distance to the detection point is small, and the traveling speed of the vehicle is high.

The ghost determination means 714 determines whether the ghost likelihood is larger than the ghost likelihood threshold. For example, the ghost determination means 714 determines whether the ghost likelihood is larger than the ghost likelihood threshold by comparing the ghost likelihood evaluated by the ghost likelihood evaluation means 706 with the ghost likelihood threshold set by the ghost likelihood threshold setting means 709.

As a result of performing decoupling of changing the timing of the probing wave transmitted by the sonar 21 and the sonar 22 by the transmission/reception control means 710, if the position of the detection point is not changed before and after the decoupling and it is found that the detection point is not a ghost, the obstacle detection device performs emergency braking, for example. In this case, the decoupling may cause a situation such that delay of detection caused by changing the transmission interval may directly cause delay of emergency braking, and a situation such that the delay of detection affects tracking of the detection point and indirectly cause delay of emergency braking.

When the transmission interval is changed, a size of the predicted circle is changed in identity determination performed by the detection point tracking means 705, so that the detection point that should be present within the circle if the size of the predicted circle is not changed may become out of the predicted circle, or an extra detection point may enter the predicted circle to cause erroneous estimation of the moving speed or erroneous estimation of the moving direction, for example.

Thus, the detection point at a position slightly different from that before the decoupling may be determined to be a detection point of another new object, not the same detection point as that of the previous object. In this case, the new object is treated as an obstacle candidate and does not become a target of emergency braking until it is continuously detected predetermined number of (for example, three) times, so that emergency braking is delayed as a result. In such a case in which emergency braking may be delayed, it can be said that the adverse effect is caused due to the decoupling.

Due to the decoupling, the adverse effect may be caused or is not caused in some cases, the adverse effect such as delay of emergency braking or disturbance in tracking of the detection point. Examples of a condition for causing the adverse effect include conditions such as a traveling direction, an approaching direction, a distance, an own vehicle speed, and an approaching speed.

The condition of the traveling direction is a case in which the detection point is present in the traveling direction of the own vehicle. In this case, emergency braking may be required, so that the adverse effect may be caused. On the other hand, in a case in which the detection point is not present in the traveling direction of the own vehicle, for example, in a case in which the detection point is present in front of the own vehicle and the own vehicle is moving backward, emergency braking is not required, so that there is no adverse effect.

The condition of the approaching direction is a case in which the detection point approaches in the traveling direction of the own vehicle. In this case, emergency braking may be required when the obstacle moves on the route of the own vehicle, so that the adverse effect may be caused. On the other hand, if the detection point moves away from the route of the own vehicle, there is no adverse effect.

The condition of the distance is a case in which the detection point is close to the own vehicle. As the detection point is closer, necessity of emergency braking is increased, so that the adverse effect is increased. On the other hand, the approaching obstacle is present at a sufficiently distant place, emergency braking is not required, so that there is no adverse effect.

The condition of the own vehicle speed is a case in which the own vehicle speed is high. As the own vehicle speed is higher, necessity of emergency braking is increased, so that the adverse effect is increased. On the other hand, in a case in which the speed of the own vehicle is zero, emergency braking is not required, so that there is no adverse effect.

The condition of the approaching speed is a case in which the approaching speed of the detection point is high. In a case in which the approaching speed of the detection point is high, tracking may fail in identity determination (tracking of the detection point) performed by the detection point tracking means 705, so that the adverse effect is large. On the other hand, in a case in which the approaching speed of the obstacle is low, sight of the detection point is hardly lost in tracking, and emergency braking is not suddenly required, so that the adverse effect is small.

The conditions of the adverse effect are examples. The condition of the adverse effect may be defined such that the adverse effect is increased as the collision margin time is shorter by collectively considering the distance, the own vehicle speed, and the approaching speed (combining at least two of them), and using the collision margin time until emergency braking is required as a measure.

When decoupling is occasionally performed in a case in which the adverse effect is large, influence such as delay of emergency braking may be caused. Thus, in a case in which there is the possibility that decoupling is required, the decoupling may be performed at a time when the adverse effect is low. Specifically, the adverse effect evaluation means 713 may obtain an adverse effect evaluation value indicating evaluation of the adverse effect, and the transmission/reception control means 710 may perform decoupling in accordance with the adverse effect evaluation value.

In a case in which the adverse effect is small or there is no adverse effect, the vehicle 1 is not actually damaged even if decoupling is performed. Thus, for example, the ghost likelihood threshold for determining whether to perform decoupling by being compared with the ghost likelihood may be set to be low, and decoupling may be positively performed even if the ghost likelihood is small. Alternatively, decoupling may be performed even in a case in which there is only one characteristic of an interference ghost. This is because, if it is determined whether the detection point is a ghost by performing decoupling earlier, decoupling is not required even when the condition the adverse effect of which is large is established later.

For example, in a case in which the adverse effect evaluation value tends to be increased, correction for lowering the ghost likelihood threshold may be additionally performed, and decoupling may be performed while a penalty is low (the adverse effect is small). That is, if the adverse effect becomes larger later, decoupling may be performed earlier. In contrast, not to perform decoupling that causes the adverse effect as much as possible, decoupling may be performed at a timing immediately before the vehicle 1 is actually damaged. That is, decoupling may be delayed as much as possible in a range in which actual damage is not caused.

For example, the collision determination means 711 determines presence/absence of the possibility of collision with the detection point. In a case in which there is the possibility of collision, the collision margin time calculation means 712 calculates the collision margin time until collision, and in a case in which the collision margin time is smaller than the predetermined collision margin time threshold, decoupling of changing the transmission interval may be performed.

Examples of the collision margin time threshold include a first margin time threshold indicating a margin time until it is determined to make a notification of approach of the obstacle and make advance waring of emergency braking, a second margin time threshold indicating a margin time until it is determined to perform emergency braking, and a third margin time threshold indicating a margin time until it is determined to perform decoupling.

The third margin time threshold is a threshold for definitely determining, in a case in which the detection point is an interference ghost, that the detection point is the interference ghost before the driver notices that fact. For example, when a difference between a third collision margin time threshold and a first collision margin time threshold (the third collision margin time threshold—the first collision margin time threshold) is larger than a time (for example, corresponding to two detection intervals) required for definitely determining whether the detection point is the interference ghost by decoupling, decoupling can be performed before making a notification of approach of the obstacle and making advance warning of emergency braking, and it can be definitely determined whether the detection point is the interference ghost. Accordingly, it is possible to avoid the adverse effect caused by an erroneous warning in a case in which the detection point is a ghost, that is, the adverse effect as an impression such that the driver misunderstands that the sonar has performed erroneous recognition.

A time for performing decoupling may be determined in accordance with a condition of ghost likelihood evaluation. For example, in a case in which the approaching speed of the detection point is a half of the approaching speed of the oncoming vehicle, the ghost likelihood evaluation means 706 evaluates the ghost likelihood to be high. Such determination based on a characteristic of the speed can be applied after the detection point identification means detects the oncoming vehicle. If the detection point is a ghost, the ghost likelihood becomes higher at the time when the oncoming vehicle is detected and the approaching speed is identified, so that the transmission/reception control means 710 may perform decoupling at the time when the ghost likelihood exceeds the threshold. In this case, the time for performing decoupling is determined at the time when the oncoming vehicle is detected and the approaching speed is identified.

Decoupling may be performed by any of the own vehicle and the oncoming vehicle, so that a measure of not positively performing decoupling may be employed while expecting that the oncoming vehicle performs decoupling. For example, in a case in which the own vehicle and the oncoming vehicle include the same sonar system, both of them may evaluate the adverse effect, and the vehicle the adverse effect of which is smaller may perform decoupling. As illustrated in FIG. 11, in a case in which the own vehicle 2 and the other vehicle 3 approach each other, if the sonar of the other vehicle 3 transmits the probing wave at a slightly earlier timing than the own vehicle 2, the ghost appears in the vicinity of the own vehicle 2. The own vehicle 2 has higher necessity of definitely determining whether the detection point is a ghost, so that the problem of interference is solved when the own vehicle 2 performs decoupling.

However, when decoupling is performed in a state in which the detection point is close to the own vehicle 2, the adverse effect such as a delay of emergency braking may be caused. Thus, the transmission/reception control means 710 may be set to cause the other vehicle 3 to perform decoupling because the detection point is closer to an opposite vehicle when viewed from the other vehicle 3. This is because, in a case in which the same systems are mounted on the own vehicle 2 and the other vehicle 3, optimum control for the entire system can be achieved by causing the vehicle the adverse effect of which is smaller to perform decoupling. However, in some cases, the opposite vehicle as the oncoming vehicle does not have a control function for performing decoupling when the detection point is closer to the opposite vehicle. In this case, the opposite vehicle does not perform decoupling, so that the own vehicle needs to perform decoupling before the detection point comes too close.

As described above, regarding the detectable distance detected by the detection point identification means 703, an upper limit (M×T/2) of the detectable distance is determined in accordance with the transmission interval T. If a time of the transmission interval multiplied by 1.5 is inserted for decoupling, for example, an undetectable region is not generated in a normal detectable range, but tracking of the detection point is influenced by lengthening of the detection interval.

If a time of the transmission interval multiplied by 0.5 is inserted, only a time in which the detection interval is multiplied by 0.5 is increased in a range of half of a normal detectable distance (M×T/4), so that influence on tracking of the detection point is small. However, with a distance equal to or larger than the half of the normal detectable distance, one time of detection is eliminated, so that the detection point cannot be determined to be the same detection point as the detection point two times before (that is, tracking fails and the sight of the detection point is lost) in tracking (identity determination) of the detection point at the next time, and the detection point may be erroneously determined to be a new detection point.

On the other hand, if a time of a distance of 1.5 times the normal detectable range is inserted, tracking of the detection point is influenced irrespective of the distance. Thus, which of the time of the transmission interval multiplied by 0.5 or the time of the transmission interval multiplied by 1.5 is inserted may be selected in accordance with the distance to the detection point using a half of the detectable distance (M×T/4) as a threshold. For example, risk can be reduced as a whole by inserting the time of the transmission interval multiplied by 1.5 in a case in which the distance to the detection point is equal to or larger than the threshold (M×T/4), and inserting the time of the transmission interval multiplied by 0.5 in a case in which the distance to the detection point is smaller than the threshold (M×T/4).

When the time of the transmission interval multiplied by 0.5 is inserted in a case in which the distance to the detection point is equal to or smaller than the detectable distance, the detection interval is not lengthened in a region within a half of the detectable distance, and one time of detection is skipped in a range farther than the half of the detectable distance. However, it can be said that a disadvantage is small because the detection point at a closer place becomes a target of collision determination, and the detection point farther than the half of the detectable distance does not become the target. When the time of the transmission interval multiplied by 1.5 is inserted in a case in which the detection point is present at a position at a distance equal to or larger than a half of the detectable distance, detection is not skipped irrespective of the distance, so that the disadvantage is minimized as a whole.

At the time of performing decoupling because the detection point described above is close to the opposite vehicle, the transmission/reception control means 710 may switch control such that, using a half of the normal detectable distance (M×T/4) as a threshold, the own vehicle does not perform decoupling while expecting that the opposite vehicle performs decoupling when the distance to the detection point is equal to or larger than the threshold, and the own vehicle performs decoupling when the distance to the detection point is smaller than the threshold.

For example, the distance to the detection point is equal to or larger than a predetermined threshold (by way of example, M×T/4, that is, 8.5 (m) in a case in which a normal transmission interval is 100 (ms)), the detection point is close to the opposite vehicle with high possibility, so that the own vehicle having low risk performs decoupling by inserting the time of the transmission interval T multiplied by 1.5. In this case, an adverse effect may be caused in tracking of the detection point, but a substantial adverse effect such as a delay of emergency braking is not caused even when tracking of the object at a distance equal to or larger than the threshold is disturbed.

If an interference state is continued at the time when the distance to the detection point becomes smaller than the predetermined threshold, the transmission/reception control means 710 determines that the opposite vehicle does not perform decoupling, and performs decoupling while inserting the time of the transmission interval multiplied by 0.5. In this case, the threshold distance is larger than a distance for determining activation of emergency braking, and detection is not skipped at a distance smaller than the threshold, so that an adverse effect is not caused.

To eliminate the possibility that emergency braking is delayed due to decoupling, the transmission/reception control means 710 may perform decoupling at a timing earlier than a time of determining activation of emergency braking. For example, in a case in which the detection point identified by the detection point identification means 703 comes closer to a point at a predetermined distance (by way of example, a distance for determining collision+α), the transmission/reception control means 710 performs decoupling. That is, decoupling is performed at a point farther than a distance requiring automatic braking. Alternatively, as described above, the transmission/reception control means 710 may change the transmission interval (decoupling) at the time when the collision margin time until collision becomes smaller than the predetermined collision margin time threshold.

For example, in a case in which the detection point tracking means 705 determines that the distance to the detection point in the vehicle width direction (Y-axis direction) tends to reduce without waiting for approach of the detection point, the transmission/reception control means 710 may perform decoupling of changing the transmission interval. This is because, if the detection point moves to be closer to the route of the own vehicle, decoupling is required in any case, although decoupling is not required and the detection point can be neglected when there is no risk of collision in any of a case in which the detection point moves on a line parallel with the route of the own vehicle, and a case in which the detection point moves away from the line parallel with the route of the own vehicle.

Furthermore, decoupling may be performed when the number of times when the ghost determination means 714 determines that the ghost likelihood exceeds the ghost likelihood threshold reaches a predetermined number. For example, when determining that the ghost likelihood is equal to or larger than the ghost likelihood threshold a predetermined number of times (two or more times) (for example, two times in a case in which an obstacle candidate is promoted to an obstacle with three times of detection), the transmission/reception control means 710 performs decoupling. Alternatively, for example, in a case in which the detection point is present at a distance at which emergency braking is immediately activated when the obstacle candidate is promoted to the obstacle with three times of detection, decoupling may be performed with one time of determination irrespective of the condition of the number of times described above.

The content described above is a scheme of determining decoupling without using a concept of an adverse effect. However, the adverse effect evaluation means 713 may evaluate the adverse effect, and the transmission/reception control means 710 may perform decoupling in a case in which the adverse effect is increased, or in a case in which the adverse effect exceeds a predetermined threshold to prevent decoupling from being performed in a state in which the adverse effect is high. To avoid the adverse effect, a method not using decoupling may be used.

A problem caused by interference is that emergency braking is erroneously activated, so that the detection point that is evaluated such that the ghost likelihood is higher than the predetermined threshold by the ghost determination means 714 may be excluded from a target of collision determination for determining necessity of emergency braking in accordance with the possibility that the detection point meets the vehicle. In other words, the collision determination means 711 excludes the detection point the ghost likelihood of which is higher than the predetermined threshold from a determination target. With such a configuration, emergency braking is not activated even when a ghost approaches, and an adverse effect is not caused by decoupling.

The reception waveform acquisition means 701, the reception waveform analysis means 702, the detection point identification means 703, the detection number addition means 704, the detection point tracking means 705, the ghost likelihood evaluation means 706, the detection number determination means 707, the ghost likelihood addition means 708, the ghost likelihood threshold setting means 709, the transmission/reception control means 710, the collision determination means 711, the collision margin time calculation means 712, the adverse effect evaluation means 713, and the ghost determination means 714 are implemented when the CPU 11A of the sensor control device 70 executes a computer program.

The computer program executed by the sensor control device 70 according to the present embodiment is recorded and provided in a computer-readable recording medium such as a CD-ROM, a flexible disk (FD), a CD-R, and a digital versatile disc (DVD), as an installable or executable file.

The computer program executed by the sensor control device 70 according to the present embodiment may be stored in a computer connected to a network such as the Internet and provided by being downloaded via the network. The computer program executed by the sensor control device 70 according to the present embodiment may be provided or distributed via a broadcast system such as terrestrial data broadcasting. The computer program executed by the sensor control device 70 according to the present embodiment may be embedded and provided in the ROM 11B, for example.

Next, the following describes a processing procedure performed by the onboard system 100 configured as described above.

Figure 21:
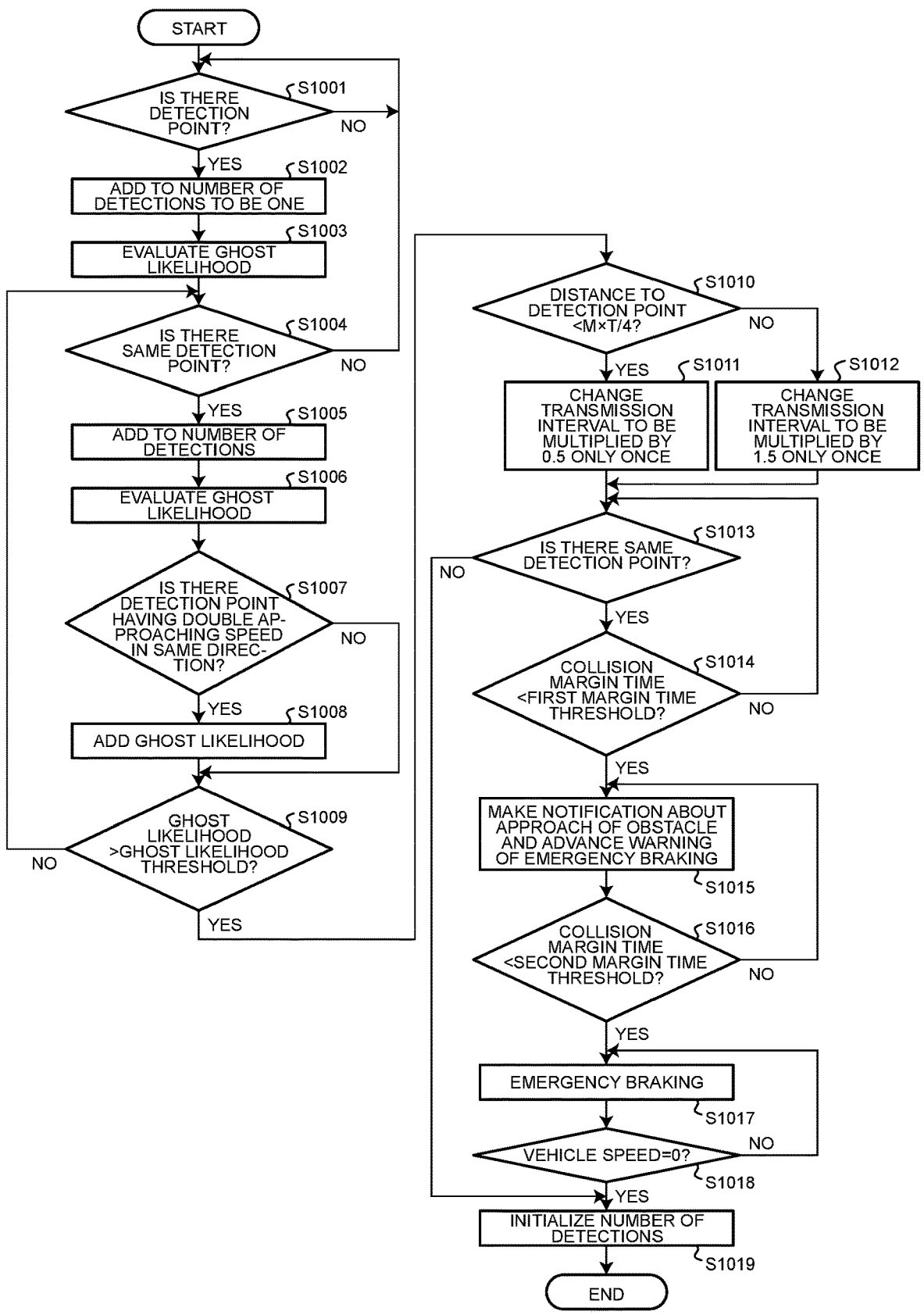
FIG. 21 is a flowchart illustrating an example of a processing procedure performed by a vehicle system according to the embodiment.

FIG. 21 is a flowchart illustrating an example of the processing procedure performed by the onboard system 100 according to the present embodiment.

First, in FIG. 21, the processing is assumed to be started in a state in which the detection number addition means 704 has initialized the number of detections, and in a state in which the reception waveform acquisition means 701 has acquired reception signals received by the transmitter-receivers.

The detection point identification means 703 successively idecifies the detection point indicating the coordinates of the detected obstacle based on a time from when one of the transmitter-receivers successively transmits the probing wave based on predetermined transmission order until the transmitter-receivers receive the reflected waves generated when the probing wave is reflected by the obstacle (Step S1001).

Herein, if there is no detection point identified by the detection point identification means 703 (No at Step S1001), Step S1001 is continued until the detection point is identified. If there is the detection point identified by the detection point identification means 703 (Yes at Step S1001), the process proceeds to S1002.

If there is the identified detection point, the detection number addition means 704 adds to the number of detections of the detection point identified by the detection point identification means 703 to be one (Step S1002).

Subsequently, the ghost likelihood evaluation means 706 evaluates the ghost likelihood indicating the likelihood that the detection point identified by the detection point identification means 703 is a ghost generated by the interference wave transmitted from the transmitter-receiver mounted on the other vehicle different from the vehicle 1 (Step S1003).

Subsequently, the detection point identification means 703 successively idecifies the detection point indicating the coordinates of the detected obstacle based on a time from when one of the transmitter-receivers successively transmits the probing wave based on the predetermined transmission order until the transmitter-receivers receive the reflected waves generated when the probing wave is reflected by the obstacle (Step S1004).

The detection point tracking means 705 performs identity determination, and determines whether there is the same detection point as the detection point identified by the detection point identification means 703 in the detection points that have been previously detected (Step S1001). If the same detection point is not present (No at Step S1004), the process returns to Step S1001. If there is the same detection point as the detection point identified by the detection point identification means 703 (Yes at Step S1004), the process proceeds to Step S1005.

If there is the same detection point as the identified detection point, the detection number addition means 704 number additionsm, by one, the number of detections of the detection point identified by the detection point identification means 703 (Step S1005).

Subsequently, the ghost likelihood evaluation means 706 evaluates the ghost likelihood indicating the likelihood that the detection point identified by the detection point identification means 703 is a ghost generated by the interference wave transmitted from the transmitter-receiver mounted on the other vehicle different from the vehicle 1 (Step S1006). That is, the ghost likelihood is evaluated only for the detection point that has been detected two or more times. This is because the detection point detected for the first time is an obstacle candidate, and is not a target of emergency braking (there is no actual damage).

Subsequently, the ghost likelihood evaluation means 706 evaluates whether another different detection point is present, the other different detection point being present in substantially the same direction as the detection point identified by the detection point identification means 703, and the moving speed of the detection point estimated by the detection point tracking means 705 being substantially two times the moving speed of the detection point (Step S1007).

If the ghost likelihood evaluation means 706 evaluates that there is no detection point having a substantially double moving speed in the same direction (No at Step S1007), the process proceeds to Step S1009. If the ghost likelihood evaluation means 706 evaluates that there is the detection point having a substantially double moving speed in the same direction and the ghost likelihood is high (Yes at Step S1007), the process proceeds to Step S1008.

When evaluating that the ghost likelihood is high, the ghost likelihood addition means 708 adds the ghost likelihood evaluation value output from the ghost likelihood evaluation means 706 (Step S1008).

Subsequently, the ghost determination means 714 determines whether the ghost likelihood added by the ghost likelihood addition means 708 is larger than the predetermined ghost likelihood threshold (Step S1009). If the ghost determination means 714 determines that the ghost likelihood is smaller than the predetermined ghost likelihood threshold (No at Step S1009), the process returns to Step S1003. If the ghost determination means 714 determines that the ghost likelihood is larger than the predetermined ghost likelihood threshold (Yes at Step S1009), the process proceeds to Step S1010.

If the ghost likelihood is larger than the predetermined ghost likelihood threshold, the detection point identification means 703 idecifies whether a distance to the identified detection point is smaller than the threshold=m×T/4 (half of the detectable distance that is determined based on the transmission interval) (Step S1010). If the distance to the identified detection point is smaller than m×T/4 (Yes at Step S1010), the detection point identification means 703 advances the process to Step S1011. If the distance to the identified detection point is equal to or larger than M×T/4 (No at Step S1010), the detection point identification means 703 advances the process to Step S1012.

If the distance to the detection point is smaller than the threshold, the transmission/reception control means 710 transmits the probing wave while changing the transmission interval thereof to be multiplied by 0.5 only once (Step S1011). Conversely, if the distance to the detection point is equal to or larger than the threshold, the transmission/reception control means 710 transmits the probing wave while changing the transmission interval thereof to be multiplied by 1.5 only once (Step S1012). That is, the transmission/reception control means 710 changes the transmission interval of the probing wave in accordance with the distance to the detection point, and the transmission interval at the time when the distance to the detection point is shorter is smaller than the transmission interval at the time when the distance to the detection point is longer.

Subsequently, in detection (reception) after changing the transmission interval (decoupling) and performing transmission, it is determined whether there is the same detection point as the detection point suspected to be a ghost before decoupling. Specifically, the detection point identification means 703 successively idecifies the detection point indicating the coordinates of the detected obstacle based on a time from when one of the transmitter-receivers successively transmits the probing wave based on the predetermined transmission order until the transmitter-receivers receive the reflected waves generated when the probing wave is reflected by the obstacle. The detection point tracking means 705 performs identity determination for the detection point close to the detection point suspected to be a ghost (the detection point having a ghost likelihood larger than the predetermined ghost likelihood threshold), and determines whether the detection point is the same detection point as the detection point suspected to be a ghost (Step S1013).

If the same detection point as the detection point suspected to be a ghost determined at Step S1009 is not present in the detection points identified by the detection point identification means 703 (No at Step S1013), the process proceeds to Step S1019. This is a branch in a case in which the detection point suspected to be a ghost disappears due to decoupling, and the number of detections is initialized at a branch destination to end the processing.

On the other hand, if there is the same detection point as the detection point suspected to be a ghost determined at Step S1009 in the detection points identified by the detection point identification means 703 (Yes at Step S1013), the process proceeds to Step S1014. This is a case in which the detection point suspected to be a ghost does not disappear even when decoupling is performed, and it is found that the detection point is not a ghost (is an obstacle as a real object).

If there is the same detection point as the detection point suspected to be a ghost, the collision margin time calculation means 712 calculates the collision margin time until the detection point meets the vehicle 1. Subsequently, the collision determination means 711 determines the collision possibility that the detection point meets the vehicle 1 and the obstacle corresponding to the detection point collides with the vehicle (Step S1014).

The collision determination means 711 compares the collision margin time calculated by the collision margin time calculation means 712 with the first margin time threshold, and if the collision margin time is larger than the first margin time threshold (No at Step S1014), the process returns to Step S1013. The collision determination means 711 compares the collision margin time calculated by the collision margin time calculation means 712 with the first margin time threshold, and if the collision margin time is smaller than the first margin time threshold (Yes at Step S1014), the process proceeds to Step S1015.

Subsequently, the HMI device 60 makes a notification related to approach of the obstacle and advance waring of emergency braking (Step S1015).

Subsequently, the collision margin time calculation means 712 calculates the collision margin time until the detection point meets the vehicle 1. Subsequently, the collision determination means 711 determines the collision possibility that the detection point meets the vehicle 1 and the obstacle corresponding to the detection point collides with the vehicle (Step S1016).

The collision determination means 711 compares the collision margin time calculated by the collision margin time calculation means 712 with the second margin time threshold, and if the collision margin time is larger than the second margin time threshold (No at Step S1016), the process returns to Step S1015. The collision determination means 711 compares the collision margin time calculated by the collision margin time calculation means 712 with the second margin time threshold, and if the collision margin time is smaller than the second margin time threshold (Yes at Step S1016), the process proceeds to Step S1017.

If the collision margin time is smaller than the second margin time threshold, the speed control device 40 controls a braking device of the vehicle 1 to perform emergency braking (Step S1017). Subsequently, the speed control device 40 determines whether the speed of the vehicle 1 is zero (Step S1018). If the speed of the vehicle 1 is not zero (No at Step S1018), the speed control device 40 returns the process to Step S1017, and repeats this process until the speed of the vehicle 1 becomes zero. If the speed of the vehicle 1 is zero (Yes at Step S1018), the speed control device 40 advances the process to Step S1019.

If the speed of the vehicle 1 is zero, the detection number addition means 704 initializes the number additioned number of detections (Step S1019). When the number of detections is initialized, this processing ends.

As described above, the obstacle detection device according to the present embodiment includes the ghost likelihood evaluation means 706 that evaluates the ghost likelihood indicating the likelihood that the detection point identified by the detection point identification means 703 is a ghost generated by the interference wave transmitted from the transmitter-receiver mounted on the other vehicle different from the vehicle.

The ghost likelihood evaluation means 706 evaluates the ghost likelihood of the detection point to be high in at least one of a case in which the movement amount and the moving direction of the detection point do not match the movement amount and the moving direction corresponding to a change of the position of the transmitter-receiver, a case in which a peak waveform corresponding to the detection point does not match a peak waveform determined in advance, and a case in which another detection point different from the detection point is present, the moving speed of the other detection point being substantially two times the moving speed of the detection point.

With the configuration according to the present embodiment described above, detection can be performed while maintaining the transmission interval of the probing wave to be constant as much as possible without being subjected to hindrance by the interference wave.

The above embodiment describes the example in which, in a case in which it is found that the detection point is not a ghost after receiving a result of ghost determination and performing decoupling processing by the transmission/reception control means 710, the collision margin time calculation means 712 calculates the collision margin time until the detection point meets the vehicle 1.

That is, in the embodiment described above, the time for performing decoupling is determined based on a change in the ghost likelihood, and the time for performing decoupling is not controlled in relation to collision determination. However, as described in a first modification described below, the time for performing decoupling may be controlled so that decoupling can be performed before emergency braking is required. The first modification describes an example of performing ghost determination after the ghost likelihood addition means 708 adds the ghost likelihood output from the ghost likelihood evaluation means 706 after receiving a result of collision determination by the collision determination means 711 with reference to FIG. 22.

First Modification

In a flowchart of the present embodiment (refer to FIG. 21), decoupling (change of the transmission interval) is performed at the time when the ghost likelihood exceeds the ghost likelihood threshold. In the first modification, the embodiment is improved such that, by adding the ghost likelihood in relation to the number of detections and a time margin until emergency braking, the transmission interval is maintained without performing decoupling (change of the transmission interval) as much as possible when the necessity thereof is low, and decoupling is performed only when it is required.

The driver may perform manual braking by himself/herself (by way of example, stepping on a brake to reduce the vehicle speed) at the time when a notification of approach of the obstacle and advance waring of emergency braking are made. Manual braking is more preferable than emergency braking because an impact on the driver is small, so that the second margin time threshold smaller than the first collision margin time threshold is provided to prevent emergency braking from being performed in a case in which the collision margin time is not smaller than the second margin time threshold.

That is, in a case in which the driver performs manual braking in response to the notification of approach of the obstacle, emergency braking is prevented from being performed. In the first modification, by adding the ghost likelihood in relation to the time margin until emergency braking, a notification about an interference ghost can be prevented from being made to the driver.

Figure 22:
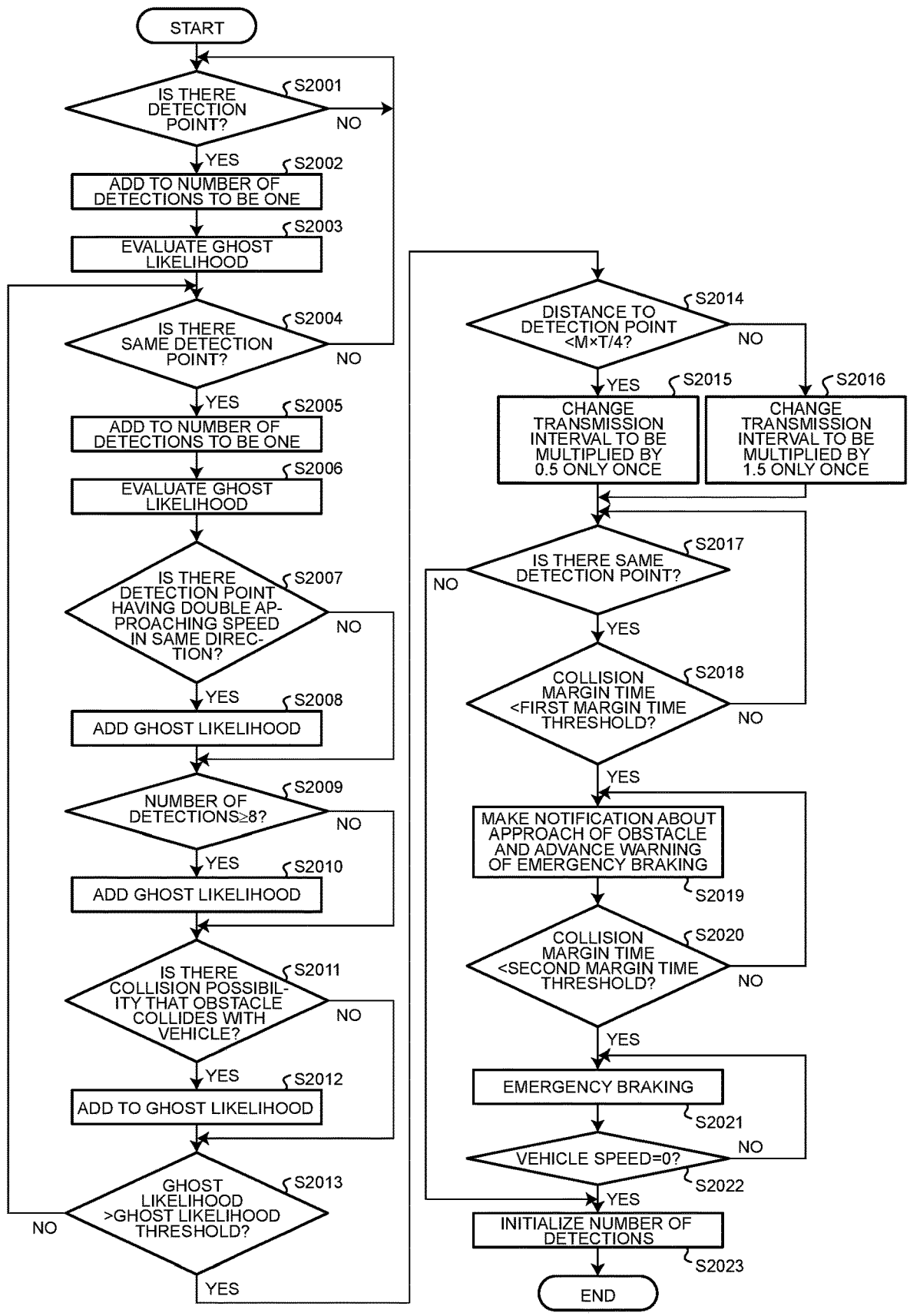
FIG. 22 is a flowchart illustrating an example of a processing procedure performed by a vehicle system according to a modification.

The following describes a processing procedure performed by the onboard system 100 according to the first modification with reference to FIG. 22. FIG. 22 is a flowchart illustrating an example of the processing procedure according to the first modification.

First, in FIG. 22, the processing is assumed to be started in a state in which the detection number addition means 704 has initialized the number of detections, and in a state in which the reception waveform acquisition means 701 has acquired reception signals received by the transmitter-receivers.

The detection point identification means 703 successively idecifies the detection point indicating the coordinates of the detected obstacle based on a time from when one of the transmitter-receivers successively transmits the probing wave based on the predetermined transmission order until the transmitter-receivers receive the reflected waves generated when the probing wave is reflected by the obstacle (Step S2001).

Herein, if there is no detection point identified by the detection point identification means 703 (No at Step S2001), Step S2001 is continued until the detection point is identified. If there is the detection point identified by the detection point identification means 703 (Yes at Step S2001), the process proceeds to S2002.

If there is the identified detection point, the detection number addition means 704 number additions the number of detections of the detection point identified by the detection point identification means 703 to be one (Step S2002).

Subsequently, the ghost likelihood evaluation means 706 evaluates the ghost likelihood indicating the likelihood that the detection point identified by the detection point identification means 703 is a ghost generated by the interference wave transmitted from the transmitter-receiver mounted on the other vehicle different from the vehicle 1 (Step S2003).

Subsequently, the detection point identification means 703 successively idecifies the detection point indicating the coordinates of the detected obstacle based on a time from when one of the transmitter-receivers successively transmits the probing wave based on the predetermined transmission order until the transmitter-receivers receive the reflected waves generated when the probing wave is reflected by the obstacle (Step S2004).

The detection point tracking means 705 performs identity determination, and determines whether there is the same detection point as the detection point identified by the detection point identification means 703 in the detection points that have been previously detected (Step S2004). If the same detection point is not present (No at Step S2004), the process returns to Step S2001. If there is the same detection point as the detection point identified by the detection point identification means 703 (Yes at Step S2004), the process proceeds to Step S2005.

If there is the same detection point as the identified detection point, the detection number addition means 704 adds 1 to the number of detections of the detection point identified by the detection point identification means 703 (Step S2005).

Subsequently, the ghost likelihood evaluation means 706 evaluates the ghost likelihood indicating the likelihood that the detection point identified by the detection point identification means 703 is a ghost generated by the interference wave transmitted from the transmitter-receiver mounted on the other vehicle different from the vehicle 1 (Step S2006).

Subsequently, the ghost likelihood evaluation means 706 evaluates whether another different detection point is present, the other different detection point being present in substantially the same direction as the detection point identified by the detection point identification means 703, and the moving speed of the detection point estimated by the detection point tracking means 705 being substantially two times the moving speed of the detection point (Step S2007).

If the ghost likelihood evaluation means 706 evaluates that there is no detection point having a substantially double moving speed in the same direction (No at Step S2007), the process proceeds to Step S2009. If the ghost likelihood evaluation means 706 evaluates that there is the detection point having a substantially double moving speed in the same direction and the ghost likelihood is high (Yes at Step S2007), the process proceeds to Step S2008.

When evaluating that the ghost likelihood is high, the ghost likelihood addition means 708 adds the ghost likelihood evaluation value output from the ghost likelihood evaluation means 706 (Step S2008).

The detection number determination means 707 determines whether the number of detections is equal to or larger than 8 (Step S2009). If the number of detections is smaller than 8 (No at Step S2009), the detection number determination means 707 advances the process to Step S2011. If the number of detections is equal to or larger than 8 (Yes at Step S2009), the detection number determination means 707 advances the process to Step S2010.

At Step S2010, the ghost likelihood addition means 708 adds the ghost likelihood evaluation value output from the ghost likelihood evaluation means 706 (Step S2010). In a case in which the number of detections is smaller than 8, this step is skipped and addition is not performed. This process is control for causing a ghost to be easily determined when the number of detections is large. On the other hand, it can be said that this process is control for causing a ghost to be hardly determined when the number of detections is small.

In a case in which a ghost is generated due to the interference wave from the oncoming vehicle, the own vehicle is not required to change the transmission interval when the oncoming vehicle performs decoupling. Thus, the own vehicle may wait for decoupling performed by the oncoming vehicle while calculating the ghost likelihood to be low during a period in which the number of detections is small, and may perform decoupling while calculating the ghost likelihood to be high only when the detection point does not disappear even after a predetermined number of times.

At Step 2009, the number of detections is evaluated, but the distance to the detection point may be evaluated instead of the number of detections. A scene in which a ghost becomes a problem is a scene in which the own vehicle approaches the other vehicle, so that the number of detections after detection is started substantially corresponds to shortening of the distance to the detection point. Thus, as the distance to the detection point is shorter, necessity of emergency braking is increased, so that decoupling (change of the transmission interval of the probing wave) may be made easier to perform.

Subsequently, the collision margin time calculation means 712 calculates the collision margin time until the detection point meets the vehicle 1, and the collision determination means 711 determines the collision possibility that the detection point meets the vehicle 1 and the obstacle corresponding to the detection point collides with the vehicle (Step S2011).

The collision determination means 711 compares the collision margin time calculated by the collision margin time calculation means 712 with the third margin time threshold, and if the collision margin time is larger than the first margin time threshold (No at Step S2011), the process proceeds to Step S2013 while skipping Step S2012. The collision determination means 711 compares the collision margin time calculated by the collision margin time calculation means 712 with the third margin time threshold, and if the collision margin time is smaller than the third margin time threshold (Yes at Step S2011), the process proceeds to Step S2012.

At Step S2012, the ghost likelihood addition means 708 adds the ghost likelihood evaluation value output from the ghost likelihood evaluation means 706 (Step S2012). This process is bonus addition for causing a ghost to be easily determined in a case in which the collision margin time is short. Conversely, it can be said that this process is control for causing a ghost to be hardly determined while the collision margin time is long.

In a case in which a ghost is generated due to the interference wave from the oncoming vehicle, the own vehicle is not required to change the transmission interval when the oncoming vehicle performs decoupling. Thus, the own vehicle may wait for decoupling performed by the oncoming vehicle while calculating the ghost likelihood to be low during a period in which the detection point is present but collision is not imminent, and may perform decoupling while calculating the ghost likelihood to be high only when collision is imminent.

As simple control, decoupling (change of the transmission interval of the probing wave) may be made easier as the speed of the vehicle 1 is higher. The collision margin time is reduced more rapidly as the speed of the vehicle 1 is higher, and the necessity of emergency braking is increased earlier, so that decoupling (change of the transmission interval of the probing wave) may be made easier to perform. At this point, for example, the ghost likelihood evaluation value corresponding to the collision margin time may be increased more greatly as the speed of the vehicle 1 is higher.

Subsequently, it is evaluated that the ghost likelihood added by the ghost likelihood addition means 708 is larger than the predetermined ghost likelihood threshold (Step S2013). If the ghost determination means 714 determines that the ghost likelihood is smaller than the predetermined ghost likelihood threshold (No at Step S2013), the process returns to Step S2005. If the ghost determination means 714 determines that the ghost likelihood is larger than the predetermined ghost likelihood threshold (Yes at Step S2013), the process proceeds to Step S2014.

If the ghost likelihood is larger than the predetermined ghost likelihood threshold, the detection point identification means 703 idecifies whether a distance to the identified detection point is smaller than the threshold=m×T/4 (half of the detectable distance that is determined based on the transmission interval) (Step S2014). If the distance to the identified detection point is smaller than m×T/4 (Yes at Step S2014), the detection point identification means 703 advances the process to Step S2015. If the distance to the identified detection point is equal to or larger than M×T/4 (No at Step S2014), the detection point identification means 703 advances the process to Step S2016.

If the distance to the detection point is smaller than the threshold, the transmission/reception control means 710 transmits the probing wave while changing the transmission interval thereof to be multiplied by 0.5 only once (Step S2015). On the other hand, if the distance to the detection point is equal to or larger than the threshold, the transmission/reception control means 710 transmits the probing wave while changing the transmission interval thereof to be multiplied by 1.5 only once (Step S2016).

Subsequently, in detection (reception) after changing the transmission interval (decoupling) and performing transmission, it is determined whether there is the same detection point as the detection point suspected to be a ghost before decoupling. Specifically, the detection point identification means 703 successively idecifies the detection point indicating the coordinates of the detected obstacle based on a time from when one of the transmitter-receivers successively transmits the probing wave based on the predetermined transmission order until the transmitter-receivers receive the reflected waves generated when the probing wave is reflected by the obstacle.

The detection point tracking means 705 performs identity determination for the detection point close to the detection point suspected to be a ghost (the detection point having a ghost likelihood larger than the predetermined ghost likelihood threshold), and determines whether the detection point is the same detection point as the detection point suspected to be a ghost (Step S2017).

If the same detection point as the detection point suspected to be a ghost determined at Step S2013 is not present in the detection points identified by the detection point identification means 703 (No at Step S2017), the process proceeds to Step S2023. This is a branch in a case in which the detection point suspected to be a ghost disappears due to decoupling, and the number of detections is initialized at a branch destination to end the processing.

Conversely, if there is the same detection point as the detection point suspected to be a ghost determined at Step S2013 in the detection points identified by the detection point identification means 703 (Yes at Step S2017), the process proceeds to Step S2018. This is a case in which the detection point suspected to be a ghost does not disappear even when decoupling is performed, and it is found that the detection point is not a ghost (is an obstacle as a real object).

If there is the same detection point as the detection point suspected to be a ghost, the collision margin time calculation means 712 calculates the collision margin time until the detection point meets the vehicle 1. Subsequently, the collision determination means 711 determines the collision possibility that the detection point meets the vehicle 1 and the obstacle corresponding to the detection point collides with the vehicle (Step S2018).

The collision determination means 711 compares the collision margin time calculated by the collision margin time calculation means 712 with the first margin time threshold, and if the collision margin time is larger than the first margin time threshold (No at Step S2018), the process returns to Step S2017. The collision determination means 711 compares the collision margin time calculated by the collision margin time calculation means 712 with the first margin time threshold, and if the collision margin time is smaller than the first margin time threshold (Yes at Step S2018), the process proceeds to Step S2019.

If the collision margin time is smaller than the first margin time threshold, the HMI device 60 makes a notification related to approach of the obstacle and advance waring of emergency braking (Step S2019).

Subsequently, the collision margin time calculation means 712 calculates the collision margin time until the detection point meets the vehicle 1. Subsequently, the collision determination means 711 determines the collision possibility that the detection point meets the vehicle 1 and the obstacle corresponding to the detection point collides with the vehicle (Step S2020).

The collision determination means 711 compares the collision margin time calculated by the collision margin time calculation means 712 with the second margin time threshold, and if the collision margin time is larger than the second margin time threshold (No at Step S2020), the process returns to Step S2019. The collision determination means 711 compares the collision margin time calculated by the collision margin time calculation means 712 with the second margin time threshold, and if the collision margin time is smaller than the second margin time threshold (Yes at Step S2020), the process proceeds to Step S2021.

If the collision margin time is smaller than the second margin time threshold, the speed control device 40 controls the braking device of the vehicle 1 to perform emergency braking (Step S2021). Subsequently, the speed control device 40 determines whether the speed of the vehicle 1 is zero (Step S2022). If the speed of the vehicle 1 is not zero (No at Step S2022), the speed control device 40 returns the process to Step S2021, and repeats this process until the speed of the vehicle 1 becomes zero. If the speed of the vehicle 1 is zero (Yes at Step S2022), the speed control device 40 advances the process to Step S2023.

If the speed of the vehicle 1 is zero, the detection number addition means 704 initializes the added number of detections (Step S2023). When the number of detections is initialized, this processing ends.

As described above, in the first modification, by adding the ghost likelihood in relation to the number of detections and the time margin until emergency braking, the transmission interval is maintained without performing decoupling (change of the transmission interval) as much as possible when the necessity thereof is low, and decoupling is performed only when a collision is imminent.

Accordingly, it is possible to increase the probability that the interference ghost is eliminated when the own vehicle does not perform decoupling during a period in which a collision is not imminent and the oncoming vehicle performs decoupling earlier, and the own vehicle can be caused not to perform decoupling (change of the transmission interval) as much as possible.

Second Modification

In a flowchart of the present embodiment (refer to FIG. 21), decoupling (change of the transmission interval) is performed at the time when the ghost likelihood exceeds the ghost likelihood threshold. In the first modification, presence/absence of necessity of decoupling is determined by comparing the ghost likelihood with the ghost likelihood threshold, and a timing of decoupling is changed in relation to emergency braking.

At a timing that is determined in relation to emergency braking, when the ghost likelihood is equal to or larger than the ghost likelihood threshold, decoupling is performed. Thus, in the flowchart, necessity of emergency braking is determined subsequent to the processing of evaluating and determining the ghost likelihood.

However, the processing of evaluating and determining the ghost likelihood and the processing of determining the necessity of emergency braking may be independently performed. For example, the flowchart illustrated in FIG. 22 may be divided into a flow of evaluating the ghost likelihood (Step S2001 to Step S2017, but excluding Step S2011) and a flow of determining the necessity of emergency braking (Step S2011, and Step S2018 to Step S2022) to be independently performed.

A factor of requiring emergency braking is not limited to the detection point suspected to be a ghost, so that it is reasonable to independently perform the pieces of processing. If definitive determination by decoupling (S2017) is required as an assumption for determining the necessity of emergency braking, a step of adding the ghost likelihood evaluation value in accordance with the collision margin time may be added to the flow of evaluating the ghost likelihood like Step S2011 to Step S2012.

Alternatively, the threshold may be lowered instead of adding the ghost likelihood. For example, assuming that the ghost likelihood threshold at the time when the collision margin time is large is a first ghost likelihood threshold, and the ghost likelihood threshold at the time when the collision margin time is small is a second ghost likelihood threshold (<first ghost likelihood threshold), whether the detection point is a ghost may be definitely determined by lowering the threshold at the time when emergency braking is imminent, and performing decoupling when the ghost likelihood exceeds the second ghost likelihood threshold.

The obstacle detection device according to the present disclosure can perform detection without being subjected to hindrance caused by a carrier wave transmitted from another vehicle while maintaining a transmission interval of a carrier wave to be constant as much as possible.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An obstacle detection device configured to control transmitter-receivers that are configured to be mounted on a vehicle, the obstacle detection device comprising:
a memory; and
a hardware processor coupled to the memory,
the hardware processor being configured to:
cause first transmitter-receivers to successively transmit carrier waves, based on a transmission order;
successively identify, when the first transmitter-receivers receive carrier waves, a detection point indicating coordinates of an obstacle, based on time differences between transmission of the carrier waves and reception of the carrier waves by the transmitter-receivers, and
evaluate a ghost likelihood indicating a likelihood that the identified detection point is a ghost that is generated due to reception of a carrier wave transmitted from another vehicle different from the vehicle, wherein
the hardware processor is configured to identify a movement amount and a moving direction of the identified detection point, and
the hardware processor is further configured to:
estimate a moving speed of the identified detection point; and
evaluate the ghost likelihood of the identified detection point to be high in a case in which another detection point that is in a substantially same direction as the identified detection point and moves at a speed substantially two times the moving speed of the identified detection point in the substantially same direction as the identified detection point, is present.

2. The obstacle detection device according to claim 1, wherein
the hardware processor is further configured to evaluate the ghost likelihood of the identified detection point to be high in any of a case in which a movement pattern indicated by a movement amount and a moving direction of the another detection point generated when causing the first transmitter-receivers to successively transmit the carrier waves does not match a movement pattern indicated by the movement amount and the moving direction of the identified detection point, and a case in which a movement pattern indicated by a movement amount and a moving direction of a detection point generated when second transmitter-receivers of another vehicle successively perform transmission matches the movement pattern indicated by the movement amount and the moving direction of the identified detection point.

3. The obstacle detection device according to claim 1, wherein
the hardware processor is further configured to analyze a reception waveform indicating a temporal change of a strength of the carrier waves received by the first transmitter-receivers, and extract a peak waveform corresponding to the identified detection point in the reception waveform to calculate a peak strength of the peak waveform or a degree of steepness of the peak waveform, and the hardware processor is further configured to evaluate the ghost likelihood of the detection point to be high in a case in which the peak strength is larger than a strength that is expected in a case in which the carrier waves travel back and forth a distance to the identified detection point, or a case in which the degree of steepness of the peak waveform is larger than a degree of steepness that is expected when dispersion is caused by reflection.

4. The obstacle detection device according to claim 1, wherein the hardware processor is further configured to compare the ghost likelihood with a ghost likelihood threshold, and the hardware processor is further configured to, when evaluating that the ghost likelihood is larger than the ghost likelihood threshold, change a transmission interval of the carrier waves.

5. The obstacle detection device according to claim 4, wherein the hardware processor is further configured to change the transmission interval of the carrier waves in accordance with a distance to the identified detection point, and the transmission interval at a time when the distance is shorter is smaller than the transmission interval at a time when the distance is longer.

6. The obstacle detection device according to claim 4, wherein the ghost likelihood is evaluated or the ghost likelihood threshold is set in accordance with a distance between the vehicle and the identified detection point, and the transmission interval of the carrier waves is made easier to change as the distance is shorter.

7. The obstacle detection device according to claim 4, wherein the ghost likelihood is evaluated or the ghost likelihood threshold is set in accordance with a vehicle speed indicating a speed at which the vehicle travels, and the transmission interval of the carrier waves is made easier to change as the vehicle speed is higher.

8. The obstacle detection device according to claim 4, wherein the hardware processor is further configured to calculate a collision margin time until the identified detection point meets the vehicle, and the hardware processor is further configured to change the transmission interval when the collision margin time is smaller than a collision margin time threshold.

9. The obstacle detection device according to claim 4, wherein the hardware processor is further configured to change the transmission interval when a distance to the identified detection point in a vehicle width direction tends to reduce.

10. The obstacle detection device according to claim 4, wherein the hardware processor is further configured to evaluate an adverse effect caused by changing the transmission interval of the carrier waves, the hardware processor is further configured to evaluate the adverse effect based on at least one of conditions that a direction of the identified detection point is same as a traveling direction of the vehicle, that a distance to the identified detection point tends to reduce, that a speed reduction of the identified detection point is large, that the distance to the identified detection point is small, and that a traveling speed of the vehicle is high, and the ghost likelihood is evaluated or the ghost likelihood threshold is set in accordance with the evaluated adverse effect or increase or decrease of the adverse effect.

11. The obstacle detection device according to claim 1, wherein the hardware processor is further configured to determine a necessity of emergency braking in accordance with a possibility that the identified detection point meets the vehicle, and the hardware processor is further configured to exclude, from a determination target, a detection point having the ghost likelihood higher than a threshold.

12. The obstacle detection device according to claim 1, wherein the hardware processor is further configured to evaluate the ghost likelihood of the identified detection point to be high in a case of at least one of:

a movement pattern of the identified detection point not matching a movement pattern of the another detection point in a case in which the received carrier waves are reflected waves from the obstacle;

the movement pattern of the identified detection point matching a movement pattern in a case in which the identified detection point is the ghost;

a characteristic of a strength or a degree of steepness of the received carrier waves matching a characteristic of a strength or a degree of steepness in a case in which the detection point is the ghost; and the another detection point being different from the identified detection point and having a direction and a speed correlated with the moving direction and the moving speed of the identified detection point, is present.

13. An obstacle detection method performed by an obstacle detection device configured to control transmitter-receivers that are configured to be mounted on a vehicle, the obstacle detection method comprising:

causing first transmitter-receivers to successively transmit carrier waves, based on a transmission order;

successively identifying, when the first transmitter-receivers receive carrier waves, a detection point indicating coordinates of an obstacle based on a time difference between transmission of the carrier waves and reception of the carrier waves by the first transmitter-receiver, evaluating a ghost likelihood indicating a likelihood that the detection point identified at the identifying is a ghost that is generated due to reception of a carrier wave transmitted from another vehicle different from the vehicle; and estimating a moving speed of the detection point, wherein in the identifying, a movement amount and a moving direction of the detection point are identified, and in the evaluating, the ghost likelihood of the detection point is evaluated to be high in a case in which another detection point that is in a substantially same direction as the detection point and moves at a speed substantially two times the moving speed of the identified detection point in the substantially same direction as the identified detection point, is present.

14. The obstacle detection method according to claim 13, wherein in the evaluating, the ghost likelihood of the identified detection point is evaluated to be high in a case of at least one of:
- a movement pattern of the identified detection point not matching a movement pattern of the another detection point in a case in which the received carrier waves are reflected waves from the obstacle;
- the movement pattern of the identified detection point matching a movement pattern in a case in which the identified detection point is the ghost;
- a characteristic of a strength or a degree of steepness of the received carrier waves matching a characteristic of a strength or a degree of steepness in a case in which the detection point is the ghost; and
- the another detection point being different from the identified detection point and having a direction and a speed correlated with the moving direction and the moving speed of the identified detection point, is present.

* * * * *